(12) United States Patent
Sugino et al.

(10) Patent No.: US 7,773,853 B2
(45) Date of Patent: Aug. 10, 2010

(54) RECORDING METHOD, RECORDING DEVICE, AND RECORDING MEDIUM

(75) Inventors: Akinobu Sugino, Kanagawa (JP); Atsushi Mae, Tokyo (JP)

(73) Assignee: Sony Corporation, Tokyo (JP)

( * ) Notice: Subject to any disclaimer, the term of this patent is extended or adjusted under 35 U.S.C. 154(b) by 1435 days.

(21) Appl. No.: 10/513,694

(22) PCT Filed: Apr. 22, 2003

(86) PCT No.: PCT/JP03/05111
§ 371 (c)(1),
(2), (4) Date: Jul. 5, 2005

(87) PCT Pub. No.: WO03/096341

PCT Pub. Date: Nov. 20, 2003

(65) Prior Publication Data
US 2006/0013562 A1    Jan. 19, 2006

(30) Foreign Application Priority Data

May 9, 2002    (JP) .............................. 2002-134746
Dec. 27, 2002  (JP) .............................. 2002-382281

(51) Int. Cl.
H04N 5/76   (2006.01)
H04N 7/00   (2006.01)
H04N 5/00   (2006.01)

(52) U.S. Cl. ........................................ 386/46; 386/125
(58) Field of Classification Search ................... 386/46, 386/95, 125, 126
See application file for complete search history.

(56) References Cited

U.S. PATENT DOCUMENTS 6,215,746 B1    4/2001    Ando et al.
6,922,521 B2 *  7/2005    Okada et al. ................... 386/83

(Continued)

FOREIGN PATENT DOCUMENTS

EP          1 182 662        2/2002

(Continued)

OTHER PUBLICATIONS

Patent Abstracts of Japan, vol. 2003, No. 12, Dec. 5, 2003 & JP 2003 263857.

(Continued)

*Primary Examiner*—Thai Tran
*Assistant Examiner*—Gelek Topgyal
(74) *Attorney, Agent, or Firm*—Frommer Lawrence & Haug LLP; William S. Frommer; Thomas F. Presson

(57) ABSTRACT

A recording method of recording a file and management information for the file into a user area of a recording medium. In the case where recording start of moving picture is instructed, an operation mode at the last recording time is judged with reference to information within a memory. In the case where the operation mode at the time of last recording time is still picture mode, intermediate management information for performing management of extended file by still picture file is recorded to start recording operation in moving picture mode for recording VTS subsequently to intermediate management information. In the case where operation mode at the last recording time is moving picture mode, recording of moving picture is continued as VTS previously recorded.

13 Claims, 12 Drawing Sheets

U.S. PATENT DOCUMENTS

| | | | |
|---|---|---|---|
| 7,248,783 B2 * | 7/2007 | Hisatomi et al. | 386/70 |
| 2003/0068157 A1 * | 4/2003 | Kushibe et al. | 386/69 |
| 2003/0123853 A1 * | 7/2003 | Iwahara et al. | 386/69 |
| 2005/0152679 A1 * | 7/2005 | Matsuno et al. | 386/95 |

FOREIGN PATENT DOCUMENTS

| | | |
|---|---|---|
| EP | 1 498 893 | 1/2005 |
| EP | 1 503 586 | 2/2005 |
| JP | 2000-57746 | 2/2000 |
| JP | 2002-50131 | 2/2002 |
| JP | 2002-63765 | 2/2002 |

OTHER PUBLICATIONS

A (Hitachi Ltd), Sep. 19, 2003.

* cited by examiner

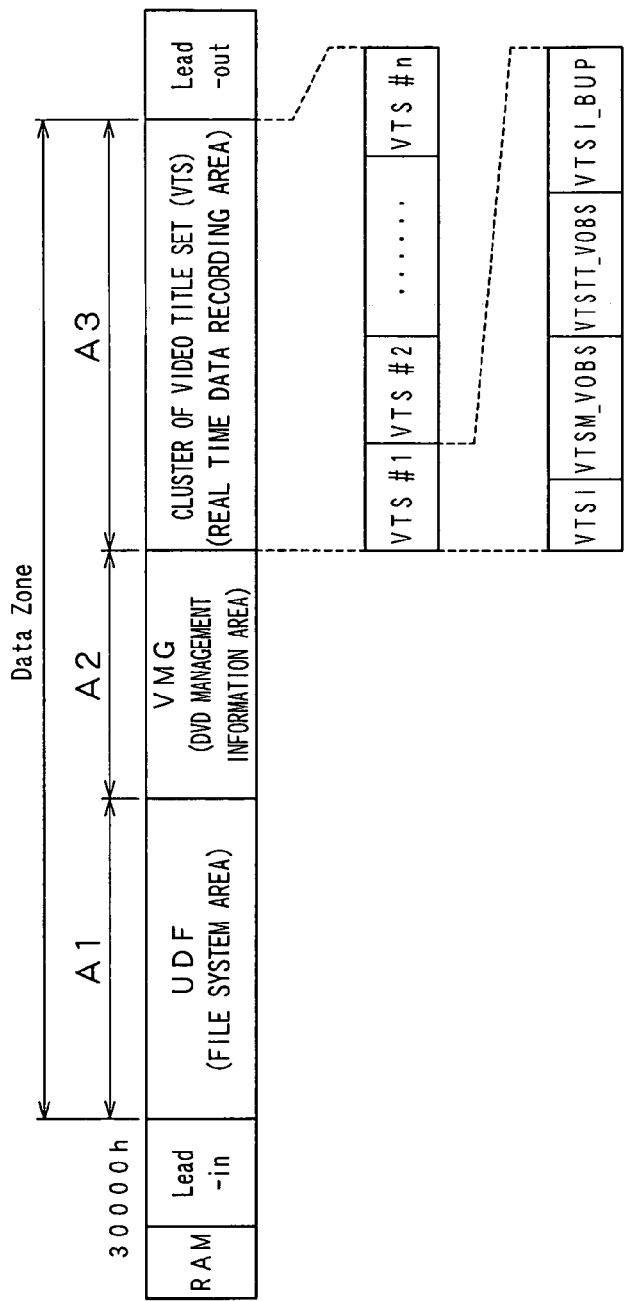

FIG.7A

| Rzone 1 | Rzone 2 | Invisible Rzone |

FIG.7B

| Rzone 1 | Rzone 2 | VTSTT_VOBS | VTSI_BUP |

FIG.7C

| Rzone 1 | VTSI | TMP_VMGI | VTSM_VOBS | VTSTT_VOBS | VTSI_BUP |

FIG.7D

| Rzone 1 | VTSI | TMP_VMGI | VTSM_VOBS | VTSTT_VOBS | VTSI_BUP | Invisible Rzone |

FIG.7E

| Rzone 1 | VTS #1 | EF |

FIG.7F

| Rzone 1 | VTS #1 | EF | Rzone 3 |

FIG.7G

| Rzone 1 | VTS #1 | EF | TMP_EXTI |

FIG.7H

| Rzone 1 | VTS #1 | EF | TMP_EXTI | Rzone 4 | Invisible Rzone |

FIG.7I

| Rzone 1 | VTS #1 | EF | TMP_EXTI | TMP_VMGI | VTSI | VTSM_VOBS | VTSTT_VOBS | VTSI_BUP |

FIG.7J

| Rzone 1 | VTS #1 | EF | ... | TMP_EXTI | VTS #2 |

FIG.7K

| Lead-in | UDF | VMG | VTS #1 | EF | TMP_EXTI | VTS #2 | ... | Lead-out |

RECORDING METHOD, RECORDING DEVICE, AND RECORDING MEDIUM

TECHNICAL FIELD

The present invention relates to a recording method, a recording apparatus and a recording medium which are adapted for recording information onto writable optical discs such as DVD-R (DVD-Recordable), etc.

This Application claims priority of Japanese Patent Application No. 2002-134746, filed on May 9, 2002 and Japanese Patent Application No. 2002-382281, filed on Dec. 27, 2002, the entireties of which are incorporated by reference herein.

BACKGROUND ART

Hitherto, in DVDs which are optical disc of large capacity, as information writable optical disc, there are provided DVD-R (DVD-Recordable) which can perform only one write operation, write-once DVD-RW (DVD-Rewritable), DVD-RAM (DVD-Random Access Memory). Among these optical discs, DVD-R and DVD-RW are adapted to record video data by the format in conformity with DVD-video format to thereby have ability to reproduce recorded video data even by reproduction (playback) only optical disc player. Furthermore, in this standard, the standard of Universal Disc Format is supported to thereby have ability to read data on disc by computer.

FIG. 1 is a diagram showing logical format of optical disc by the DVD video format. In the optical disc by this format, as shown in FIG. 1A, the information recording surface is partitioned into Lead-in, Data Zone and Lead-out from the innermost side which is the leading side, wherein desired video data, etc. are recorded in the Data Zone.

Here, the Data Zone is partitioned, from the Lead-in side, UDF (Universal Disc Format) area A1 which is file system area where UDF bridge configuration is described, VMG (Video Manager) area A2 serving as DVD management information area, and real time data recording area A3. The UDF area and the VMG area are management information recording area for performing management of files by video data recorded on the optical disc. Among these UDF and VMG areas, the VMG area which is the second management information recording area is an area corresponding to file management system specific to the DVD video format. Information of TOC which is management information for performing management of the entirety of video data recorded in the real time data recording area A3 is recorded into the VMG area. On the contrary, the UDF area A1 serving as first management information recording area is an area corresponding to the file management system by computer. Management information for performing management of the entirety of video data recorded in the real time data recording area A3 by the format which realizes compatibility with file system in computer is recorded into the UDF area A1.

The real time data recording area A3 is a user area where real data are recorded. As shown in FIG. 1B, video data are recorded into the real time data recording area A3 with VTS (Video Title Set) (hereinafter referred to as title as occasion demands) being as unit. In this example, as far as 99 VTSs can be provided at the maximum (VTS$\leqq$99). As shown in FIG. 1C, the VTS consists, from the leading side, VTSI (Video Title Set Information), VTSM VOBS (Video Object Set for the VTSM), VTSTT VOBS (Video Object Set For Titles in a VTS), and VTSI BUP (Backup of VTSI). In the VTSTT VOBS, video data by format of MPEG (Moving Picture Experts Group) 2 which are real data are recorded. In the VTSI, there is recorded recording position information, etc. which is management information for performing management of video data by the real data. In the VTSTT VOBS, title menu of video data is recorded. In this example, VTSTT VOBS is option. VTSI BUP is backup data of VTSI.

Thus, in optical discs of this kind, in the case where access is provided by computer, a desired file is retrieved by UDF to have ability to reproduce the file thus retrieved. Moreover, in the case where such optical disc is reproduced by reproduction only unit such as DVD player, etc., it is necessary to realize compatibility with the reproduction only optical disc. In view of the above as shown in FIG. 1D, there is performed a predetermined processing to form UDF area and VMG area to further form Lead-in and Lead-out. In the case where the optical disc processed in this way is reproduced by the DVD player, a desired file is retrieved by the VMG area to have ability to reproduce the file thus retrieved.

Further, as a system of writing video data onto such optical discs, there are used IncrementalRecording System (hereinafter referred to as INC system) and Restricted Over Write System (hereinafter referred to as ROW system). Here, the INC system is a system of sequentially recording video data, and the ROW system is a system applied to overwritable optical disc. It is to be noted that, also in the ROW system, in the case where data are recorded into unrecorded area, video data are sequentially recorded. In these INC system and ROW system, management of processing with respect to the optical disc such as reservation, etc. is performed by RMA (Recording Management Area) provided at the inner circumferential side of Lead-in.

The recording procedure by the INC system is shown in FIG. 2. In the INC system, it is defined that as far as three areas to be written at a time exist at the maximum. These areas are respectively called R zone, and management of respective R zone is performed by RMA.

Namely, in the case where moving picture (image) is recorded, in the INC system, as shown in FIG. 2A, R zone is first reserved. Here, reservation of R zone is executed by defining area of R zone 1 for forming UDF area and VMG area which are recording area for management information to subsequently define area of R zone 2 for forming VTSI and VTSM VOBS of the leading VTS in unrecorded area for forming real time data recording area to define the remaining unrecorded area as area of Invisible R zone. In the INC system, by reservation of the R zone 1 and the R zone 2, the recording area for management information is ensured, and an area for forming VTSI and VTSM VOBS of the leading VTS is ensured.

In the INC system, video data are recorded in sequence from the leading side of Invisible R zone to thereby form VTSTT VOBS by real data. Further, when recording of real data is completed with respect to one title by instruction of user, VTS1 BUP is recorded subsequently to recording of the real data as shown in FIG. 2B to return to the leading side to form VTS1 and VTSM VOBS in the R zone 2 as shown in FIG. 2C to close the R zone. Thus, in the INC system, one VTS is recorded on the optical disc.

Moreover, in the case where the next title is subsequently recorded, in the INC system, as shown in FIG. 2D, R zone 3 is reserved in the remaining unrecorded area to ensure areas of VTS1 and VTSM VOBS to define Invisible R zone. Further, subsequently thereto, as shown in FIG. 2E, VTSTT VOBS is formed by recording of real data thereafter to form VTSI BUP to form VTS1 and VTSM VOBS in the previously ensured area as shown in FIG. 2F. Thus, in the optical disc, as shown in FIG. 2C, the subsequent VTS is recorded. In the INC system, in the case where title is subsequently recorded, unrecorded area is similarly defined to successively record VTSs.

On the contrary, with respect to the optical disc in which VTSs are successively recorded so that real time data recording area is formed as stated above, in the INC system, as shown in FIG. 2H, recording procedure is executed by forming UDF area and VMG area by finalize processing to further form Lead-in and Lead-out so that compatibility with the reproduction only optical disc is realized. In this case, in formation of the UDF area and the VMG area, data of UDF and VMG are generated from data of VTSI and VTSM VOBS of respective titles to record these data into the R zone 1 to close the R zone 1.

Then, recording procedure by the ROW system is shown in FIG. 3. In the ROW system, as shown in FIG. 3A, recording areas for Lead-in, UDF, VMG and VTSI and VTSM VOBS of leading title are ensured in advance by Padding. Here, the Padding is processing for recording dummy data such as NULL, etc. to ensure areas.

When these areas are ensured in this way, video data are sequentially recorded, as shown in FIG. 3B, in the ROW system to thereby form VTSTT VOBS by real data. When recording of real data has been completed with respect to one title, VTSI BUP is subsequently recorded as shown in FIG. 3B to further execute padding processing for the purpose of ensuring recording areas of VTSI and VTSM VOBS of the subsequent titles. Moreover, subsequently, returning to the leading side, VTSI and VTSM VOBS corresponding to recording of real data are formed as shown in FIG. 3C. Thus, in the ROW system, one VTS is recorded onto the optical disc.

Further, in the case where the next title is subsequently recorded, in the ROW system, as shown in FIG. 3D, succeeding to the padding area formed by VTS immediately therebefore, VTSTT VOBS and VTST BUP are formed by recording of real data to execute padding processing for the purpose of ensuring recording areas for VTSI and VTSM VOBS of the succeeding titles. Further, subsequently, as shown in FIG. 3E, VTSI and VTSM VOBS are formed. Thus, as shown in FIG. 3F, the subsequent VTS is recorded onto the optical disc. In the ROW system, in the case where titles are continuously recorded, processing such as padding, etc. is similarly executed to successively record VTSs.

On the contrary, with respect to the optical disc in which VTSs are recorded in succession in this way so that real time data recording area has been formed, in the ROW system, as shown in FIG. 3G, UDF area and VMG area are formed by finalize processing similar to that of the INC system to further form Lead-in and Lead-out so that compatibility with reproduction only optical disc is realized (Japanese Patent Application Laid Open No. 2001-351314 publication).

Meanwhile, in the case where DVD-video format recording is generally performed with respect to DVD-R or DVD-RW media, file system for performing management of intermediate state is required. If corresponding recording is recording only based on the DVD-video standard, since information for performing management of VTS is also held in the file system in the intermediate state, in the case where VTS is erased, management of position of empty (space) LSN (logical Sector Number) on media is performed. By utilizing such information, it becomes possible to newly make recording at the corresponding position.

For example, there is disclosed a technology in which in the case where information are recorded onto DVD-R along real time, information are recorded in order to have ability to perform reproduction also by player for reproduction only DVD player on which information have been recorded irrespective of real time (Japanese Patent Application Laid Open No. 2002-063765 publication). In this disclosed technology, in the case where information are recorded onto DVD-R while being in conformity with the DVD video standard caused to be of configuration at least including VTS including VOBS and VTSI which are reproduced, and VMGI for controlling reproduction of one or plural VTS or VTSs, VTS is recorded onto the DVD-R to generate temporary VMGI which is temporary control information which corresponds to the recorded VTS and for forming VMGI later to record it onto the DVD-R after recording of VTS to record generated temporary VMGIs onto the DVD-R every time VTSs are recorded onto the DVD-R. As stated above, when unit recording information is recorded, temporary control information is generated to temporarily the temporary control information thus generated onto write-once recording medium, whereby even in the case where plural unit recording information are recorded at the write-once recording medium, primary management control information is precisely recorded later by using temporary control information having the latest content to thereby have ability to execute information recording along real time with respect to the write-once recording medium in conformity with recording format for reproduction only recording medium which is not based on the premise of information recording along real time.

However, there is a demand that extended files are also recorded onto DVD-R media. For example, it is conceivable that such optical discs are applied to portable camera integrated type video recorder in place of magnetic tape. In this case, in the conventional portable camera integrated type video recorders, there are some portable camera integrated type video recorders which can record not only moving picture (image), but also still picture (image). Therefore, also in optical discs of this kind, it is desired that still pictures (images), etc. except for moving picture (image) can be recorded.

Also in the case where such extended file is held at intermediate file system, any management information for recognizing space use state is required. However, there is the problem that management information for DVD-video and/or plural kinds of extended file management information must be referred in order to obtain empty space information so that mounting becomes complicated.

In addition, there is the problem that, in the case of mounting which does not comply with extended file, it becomes impossible to recognize LSN in which recording is subsequently started.

In the case where the DVD disc is used as recording medium and recording is made by the DVD video format, since recording contents are recorded in succession onto the disc, it is necessary to once partition the recording contents as area when kind of recording is different. For example, it is necessary to write information which provides basis of the file system to complete VTS area. However, in such reproduction bridging over the VTS area, management area of reproduction must return to management area of the entirety of the disc to judge next reproduction area. There are instances where some players cannot perform reproduction in a seamless manner in continuous reproduction. Accordingly, it is required to prepare extended areas while continuing areas of the VTS as far as possible.

DISCLOSURE OF THE INVENTION

In view of problems of the prior arts as described above, an object of the present invention is to provide a disc recording method, a disc recording apparatus, and an optical disc which can record files of still pictures (images), tec. except for moving pictures (images), and which are adapted to have ability to prepare extended area while continuing areas of VTS as far as possible.

In the DVD video format, the above-mentioned VTSs are continuously recorded so that seamless reproduction can be performed. However, since information are recorded in recording time order onto the same medium, it is not inevitable that the above-mentioned VTS area may be divided. In view of the above, the condition for entering the extended area is caused to be strict to perform processing for dividing VTS only when recording must be truly conducted. For example, in the case of equipments capable of recording still pictures (images), there are many cases where the operation mode is divided into mode for still picture and mode for moving picture for convenience of the system. In the case where moving picture recording is performed, even if the switch is switched into the mode for photographing still picture as mode, when an operation for actually photographing still picture (e.g., shutter button is pushed down) is not performed, mark of end of recording of moving picture is not made onto the disc. Moreover, similarly also with respect to still picture, until recording of moving picture (pushing down of start button) is made next, even if the switch for switching the mode is positioned at the side of moving picture, the state of the disc is caused to remain in the still picture state.

Namely, in the case where recording is made by the DVD video format onto the DVD disc, way of writing as shown in FIG. 4 is conceivable.

In FIG. 4, the area [1] is a reserved area for finally writing file system, etc., the area [2] is a reserved area for management area of VTS, and the area [3] is an area for directly writing video data. The area of VTS is constituted by repetition of write operations of the area [2] and the area [3]. During ordinary recording operation, the area [1] and the area [2] are ensured so that the state where recording has been made only into the area [3] is prepared from unrecorded state. In the case completed as VTS, information therefor is recorded into the area [2]. Thereafter, information of disc up to that VTS are recorded. Namely, unless there results the where VTS is completed, information up to that time cannot be read, and information except for moving picture cannot be written. Since attempt is made to write still picture in a form which is not form of VTS, it is required to complete VTS. As a result, the portions of the area [2] and the area [3] are placed in completed form. In this case, since respective reproduction information are divided, there is the possibility that reproduction of video data bridging over VTS may not be performed in a seamless manner. Accordingly, the area [3] is required to be as long as possible. In view of the above, in connection with such recording, in place of completing VTS in the state where mode changeover switch is placed in, e.g., "moving picture" or "still picture", when switch for hastening recording in corresponding mode, e.g., start key in the case of moving picture, or shutter key in the case of still picture is pushed down, an operation for completing the VTS is performed for the first time under the judgment where the operation mode is changed from the previous mode. It is to be noted that memory is provided within the system so as to have ability to perform buffering of the photographed data being processed for a predetermined time, and processing completed for a time during which processing thereat is being performed is performed.

The recording method according to the present invention is directed to a recording method of recording a file to be recorded and management information for the file into a user area of a recording medium in such a manner that the file and the management information form a set, the recording method comprising: switching recording format of the file and the management information with respect to the user area in accordance with attribute of the file; and recording, onto the recording medium, management information in a previous recording format when start of recording in a new recording format is instructed, and closing the recorded file in the previous recording format to start recording in the new recording format.

Moreover, the recording apparatus according to the present invention comprises: management information generating means for generating management information for a file to be recorded; recording means for recording, into a user area of a recording medium, the file and the management information corresponding to the file in such a manner that the file and the management information form a set; and control means for controlling operations of at least the management information generating means and the recording means, wherein the control means performs a control to switch recording format of the file and the management information with respect to the user area in accordance with attribute of the file to record, onto a recording medium, management information in a previous recording format when start of recording in a new recording format is instructed, and closes the recorded file in the previous recording format to start recording in the new recording format.

Further, the recording medium according to the present invention is directed to a recording medium in which control program is recorded, wherein the control program can be read by a control computer, the control program being featured by allowing the control computer, provided at a recording unit for recording, into a user area of a data recording medium, a file to be recorded and management information for the file in such a manner that the file and the management information form a set, to function as control means for performing a control to switch, in accordance with attribute of the file, recording format of the file and the management information with respect to the user area, recording, onto the data recording medium, management information in a previous recording format when start of recording in a new recording format is instructed, and closing the recorded file in the previous recording format to start recording in the new recording format.

In addition, the recording medium according to the present invention is directed to a recording medium in which control program is recorded, wherein the control program can be read by a control computer, the control program being featured by allowing the control computer, provided at a recording unit for recording, into a user area of a data recording medium, a file to be recorded and management information for the file in such a manner that the file and the management information form a set, to function as control means for performing a control to record, onto the data recording medium, management information of recording format when start of new recording, after user has performed a predetermined number of recording operations, is instructed, and closing the recorded file to start new recording.

BRIEF DESCRIPTION OF THE DRAWINGS

FIGS. 1A to 1D are diagrams used for explanation of DVD video format.

FIGS. 7A to 7K are views used for explanation of recording processing of moving picture file and still picture file by the INC system in the optical disc recording/reproducing apparatus shown in FIG. 5.

BEST MODE FOR CARRYING OUT THE INVENTION

Embodiments of the present invention will now be explained in detail with reference to the attached drawings.

Figure 2A:
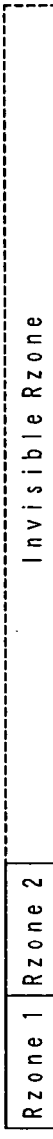
FIGS. 2A to 2H are diagrams used for explanation of recording by the INC system.
Figure 2B:
Figure 2C:
Figure 2D:
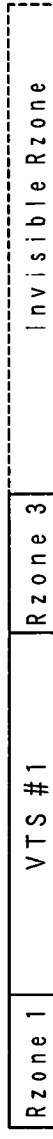
Figure 2E:
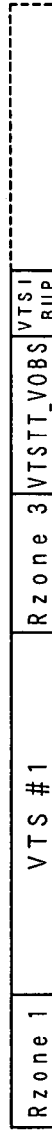
Figure 2F:
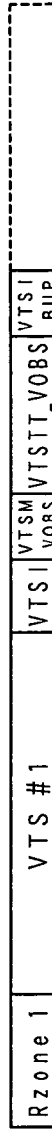
Figure 2G:
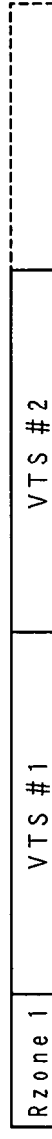
Figure 2H:
Figure 3A:
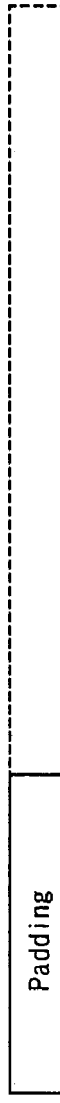
FIGS. 3A to 3G are diagrams used for explanation of recording by the ROW system.
Figure 3B:
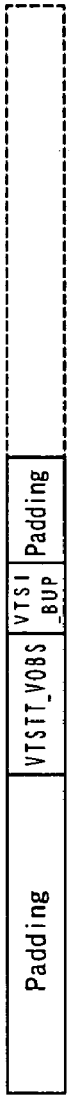
Figure 3C:
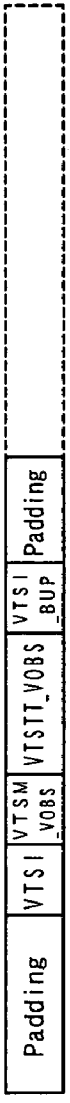
Figure 3D:
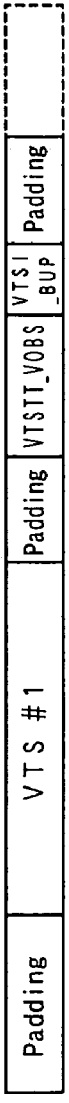
Figure 3E:
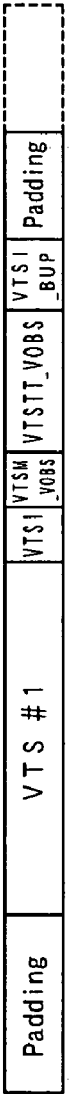
Figure 3F:
Figure 3G:
Figure 4:
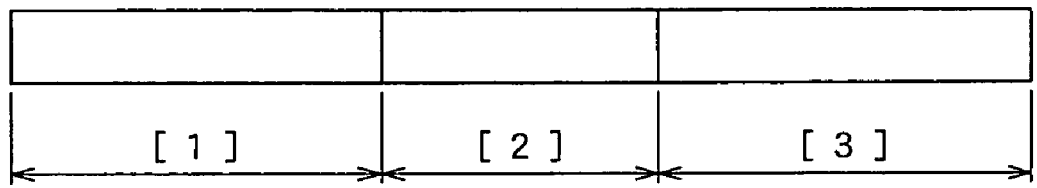
FIG. 4 is a view showing, in a model form, fundamental recording method in the case where recording is performed onto DVD disc by the DVD video format by the present invention.
Figure 5:
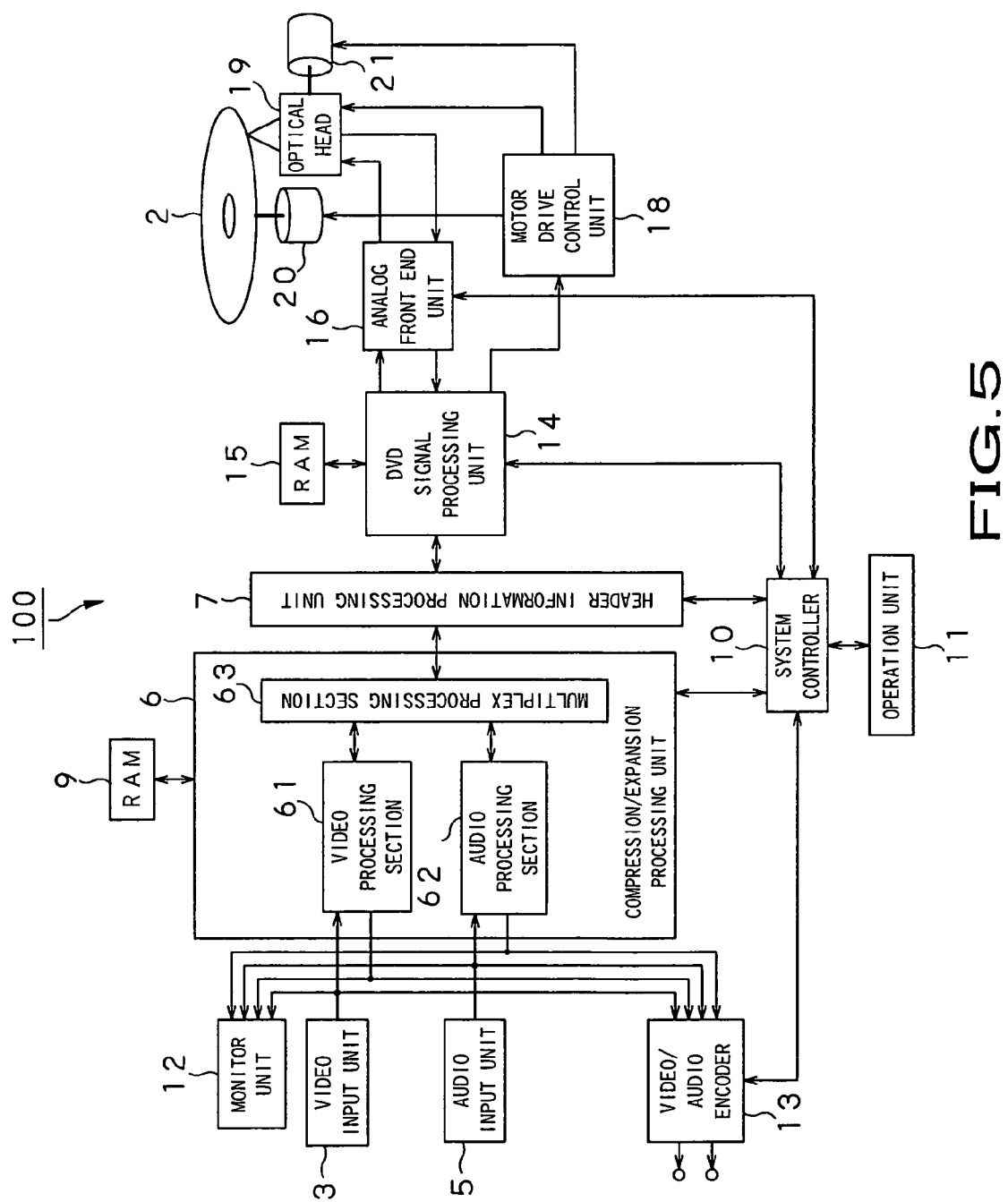
FIG. 5 is a block diagram showing the configuration of an optical disc recording/reproducing apparatus to which the present invention has been applied.

The present invention is applied to, e.g., an optical disc recording/reproducing apparatus 100 caused to be of the configuration as shown in FIG. 5.

The optical disc recording/reproducing apparatus 100 shown in FIG. 5 is adapted to record image pick-up results onto an optical disc 2 of DVD-R (DDV-Recordable).

The optical disc recording/reproducing apparatus 100 is a portable camera integrated type video recorder, and is adapted to record image pick-up results onto DVD-R (DVD-Recordable) 2 by the INC system.

The optical disc recording/reproducing apparatus 100 comprises a video input unit 3, an audio input unit 5, a compression/expansion processing unit 6, a header information processing unit 7, random access memories (RAMs) 9, 15, a system controller 10, an operation unit 11, a monitor unit 12, a video/audio encoder 13, a DVD signal processing unit 14, an analog front end unit 16, a motor drive control unit 18, an optical head 19, a spindle motor 20, and a sled motor 21, etc. The compression/expansion processing unit 6 is composed of a video processing section 61, an audio processing section 62, and a multiplex processing section 63.

In the optical disc recording/reproducing apparatus 100, the video input unit 3 serves to convert a video signal which is image pick-up result obtained by image pick-up means (not shown), or a video signal inputted from external equipment into a digital signal to thereby generate video data to deliver the video data thus generated to the compression/expansion processing unit 6, the monitor unit 12 and the video/audio encoder 13. In this example, the image pick-up means included is adapted to output image pick-up result by moving picture (image), or image pick-up result by still picture (image), under control of the system controller 10. Thus, the video input unit 3 is adapted to selectively input video data by moving picture or still picture in accordance with control of the image pick-up means by the system controller 10.

The audio input unit 5 serves to convert an audio signal acquired by microphone, or an audio signal by external input into a digital signal to thereby generate audio data to deliver the audio data thus generated to the compression/expansion processing unit 6, the monitor unit 12 and the video/audio encoder 13.

The operation of the compression/expansion processing unit 6 is switched by control of the system controller 10. At the time of recording, the compression/expansion processing unit 6 performs data compression of video data and audio data by using the random access memory 9 to perform multiplex processing thereof to output the data thus processed to the header information processing unit 7. Moreover, at the time of reproduction, the compression/expansion processing unit 6 serves to separate data obtained from the header information processing unit 7 into video data and audio data by using the random access memory 9 thereafter to respectively perform data expansion thereof to output the data thus obtained to the monitor unit 12 and the video/audio encoder 13.

Namely, at the compression/expansion processing unit 6, at the time of recording, the video processing section 61 serves to perform data compression of video data outputted from the video input unit 3 under control by the system controller 10 to output the data thus obtained. At this time, in the case where video data is moving picture (image), data compression is performed by the format of MPEG 2, whereas in the case where video data is still picture (image), data compression is performed by the format of JPEG (Joint Photographic Coding Experts Group). Moreover, at the time of reproduction, the video processing section 61 performs data expansion of video data outputted from the multiplex processing section 63 in correspondence with the data compression format thereof to output the data thus obtained. Moreover, at the time of recording, the audio processing section 62 performs data compression of audio data inputted from the audio input unit 5 by the format of MPEG, Dolby audio or linear PCM (Pulse Code Modulation), etc. to output the data thus obtained. Further, at the time of reproduction, the audio processing section 62 performs data expansion of audio data obtained from the multiplex processing section 63 to output the data thus obtained. Further, at the time of recording, the multiplex processing section 63 performs time-divisional multiplex processing of video data outputted from the video processing unit 61 and audio data outputted from the audio processing section 62 to output the data thus processed to the header information processing unit 7. In addition, at the time of reproduction, the multiplex processing section 63 serves to separate video data and audio data from time-divisional multiplexed data outputted from the header information processing unit 7 to respectively output the video data and the audio data to the video processing section 61 and the audio processing section 62.

The monitor unit 12 is comprised of a display mechanism/speech processing mechanism for monitoring video data inputted from the video input unit 3, audio data inputted from the audio input unit 5, and/or video data and audio data which are outputted from the compression/expansion processing unit 6. Thus, the optical disc recording/reproducing apparatus 100 is adapted to have ability to monitor image pick-up results and reproduction results.

The video/audio encoder 13 performs, by a predetermined format, data compression of audio data which are inputted from the audio input unit 5, video data inputted from the video input unit 3 and/or video data and audio data which are outputted from the compression/expansion processing unit 6 to output the data thus obtained to external equipment. Thus, the optical disc recording/reproducing apparatus 100 is adapted to have ability to monitor, by external equipment, image pick-up results and reproduction results.

At the time of recording, the header information processing unit 7 receives time-divisional multiplexed data outputted from the compression/expansion processing unit 6 to add header information specific to DVD and/or header information of extended file, etc. thereto under the control by the system controller 10 to output such data. Moreover, the header information processing unit 7 generates data of UDF, VMG and/or VTSI, etc. by information from the system controller 10 to output the data thus generated to the DVD signal processing unit 14. Further, at the time of reproduction, the header information processing unit 7 separates header information added at the time of recording from output data of the DVD signal processing unit 14 to output the header information thus separated to the compression/expansion processing unit 6. In addition, the header information processing unit 7 notifies the separated header information to the system controller 10. It is to be noted the extended file is file which is not defined by the DVD video format which is the format standardized with respect to the optical disc 2, and files of still picture (image) are applied to the extended file in this embodiment.

At the time of recording, the DVD signal processing unit 14 generates, by using the random access memory 15, error correction code from output data of the header information processing unit 7 to add the error correction code to the output data. Moreover, the DVD signal processing unit 14 executes processing such as scramble processing and/or 8/15 modulation, etc. to output data train by the processing result thereof to the analog front end unit 16 by serial data train. Further, at the time of reproduction, in a manner opposite to that at the time of recording, the DVD signal processing unit 14 performs decode processing, descramble processing and/or error correction processing of output data of the analog front end unit 16 to output processing results thus obtained to the header information processing unit 7. In addition, the DVD signal processing unit 14 performs digital/analog conversion processing of various drive information for spindle control, tracking control, focus control and sled control outputted from the system controller 10 to generate drive signals for these information to output these drive signals to the motor drive control unit 18.

The analog front end unit 16 generates a light quantity control signal with respect to laser beams irradiated from the optical head 19 onto the optical disc 2 to output the light quantity control signal thus generated. At the time of reproduction, the analog front end unit 16 maintains, by the light quantity control signal, light quantity of laser beams irradiated from the optical head 19 onto the optical disc 2 at a predetermined light quantity for reproduction. On the other hand, at the time of recording, the analog front end unit 16 changes signal level of the light quantity control signal in accordance with output data from the DVD signal processing unit 14 to thereby intermittently raise (increase) light quantity of laser beams from light quantity at the time of reproduction to light quantity at the time of recording in accordance with output data from the DVD signal processing unit 14.

Moreover, the analog front end unit 16 amplifies light receiving result of return light obtained from the optical head 19 to perform arithmetic processing thereof to thereby generate a reproduction signal of which signal level changes in correspondence with pit train formed at the optical disc 2 to output, to the DVD signal processing unit 14, reproduction data which is binary discrimination result of the reproduction signal by signal processing of the reproduction signal. In addition, the analog front end unit 16 generates, by the arithmetic processing, a tracking error signal and a focus error signal, etc. of which signal levels change in accordance with tracking error quantity and focus error quantity to output these signals to the system controller 10 by digital signal.

The motor drive control unit 18 respectively drives, by various drive signals outputted from the DVD signal processing unit 14, mechanisms respectively corresponding thereto. Namely, the motor drive control unit 18 rotationally drives the spindle motor 20 and the sled motor 21 by drive signal for spindle control and drive signal for sled control among these drive signals. Moreover, the motor drive control unit 18 drives actuator mounted at the optical head 19 by drive signal for tracking control and drive signal for focus control.

The spindle motor 20 rotationally drives, at a predetermined rotational speed, the optical disc 2 in the state where it is chucked. The sled motor 21 moves the optical head 19 in the radius direction of the optical head 2.

The optical head 19 emits laser beams from semiconductor laser included therewithin by light quantity control signal outputted from the analog front end unit 16 to converge the laser beams onto the information recording surface of the optical disc 2 through object lens. Moreover, the optical head 19 guides return light obtained from the optical disc 2 by irradiation of the laser beams to a predetermined light receiving element through the object lens to output light receiving result of the light receiving element to the analog front end unit 16. At the optical head 19, the object lens can be moved by actuator driven by drive signal for tracking control and drive signal for focus control. Thus, tracking control and focus control can be performed. Further, light quantity of laser beams is intermittently raised (increased) by light quantity control signal. Thus, temperature of the information recording surface of the optical disc 2 is locally raised to record desired data.

The system controller 10 is comprised of a computer for controlling the operation of the entirety of the optical disc recording/reproducing apparatus 100, and serves to execute processing programs installed in advance at the optical disc recording/reproducing apparatus 100 to thereby control operations of respective units (components) by operation input of user obtained through the operation unit 11, and/or various signals, etc. detected at the analog front end unit 16. Namely, the system controller 10 generates drive information for tracking control and for focus control by tracking error signal and focus error signal which are detected at the analog front end unit 16 to convert them into analog signals at the DVD signal processing unit 14 to output the analog signals thus obtained to the motor drive control unit 18 to thereby execute processing of tracking control and focus control. Further, the system controller 10 detects laser beam irradiation position by header information, etc. detected at the header information processing unit 7 to generate drive information for sled control by the detection result to output the drive information thus generated to the DVD signal processing unit 14 to thereby execute processing such as seek, etc. Further, the system controller 10 executes processing of spindle control in a manner as stated above.

Figure 6:
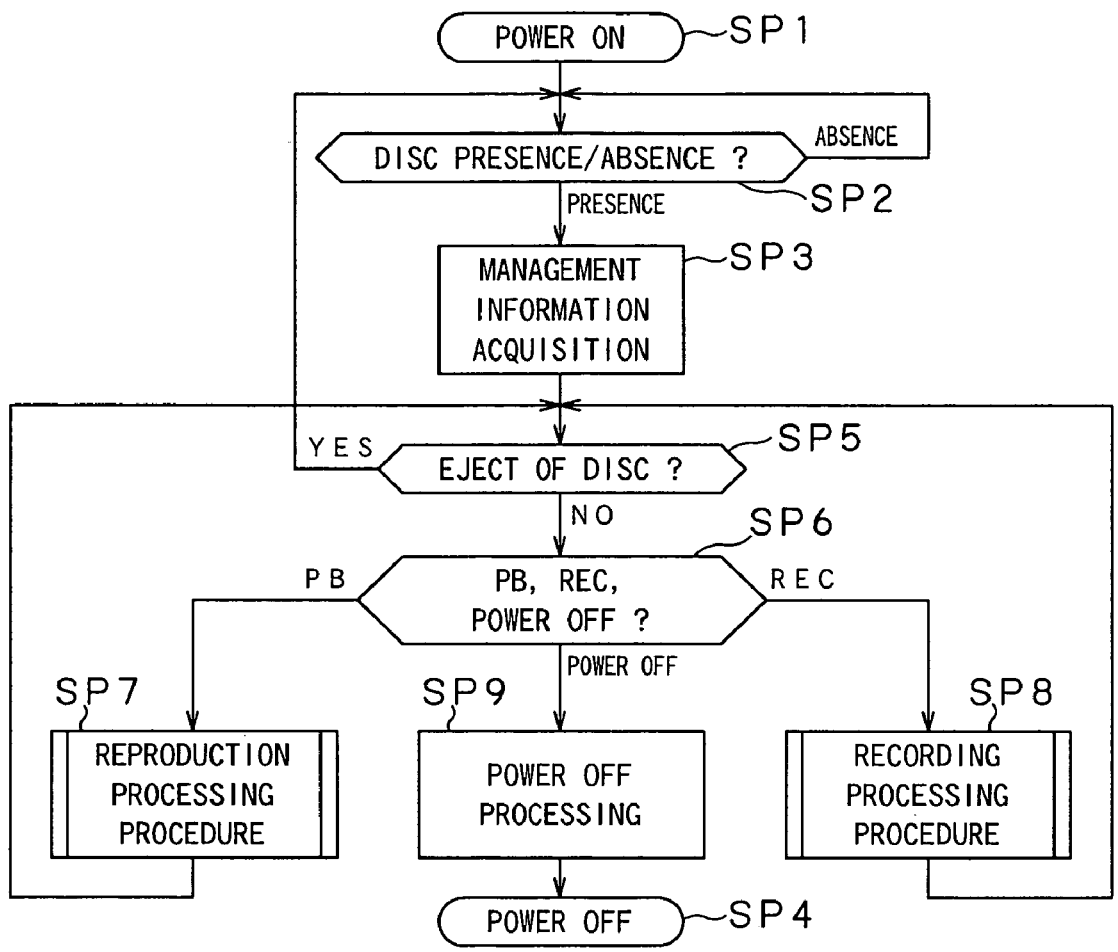
FIG. 6 is a flowchart showing the procedure of processing executed at the time of turning ON of power supply in the optical disc recording/reproducing apparatus shown in FIG. 5.

Further, on the premise of these processing relating to the optical disc 2, power is turned ON to thereby execute processing procedure shown in FIG. 6. Namely, when power is turned ON (Power On), processing by the system controller 10 shifts from step SP1 to step SP2. Thus, the system controller 10 judges presence or absence of the optical disc 2 from detection result by the mechanism for detecting the optical disc 2 which is not shown. When denial result is obtained at this step, the system controller 10 repeats the step SP2. On the contrary, in the case where power is turned ON in the state where the optical disc 2 is loaded, or when the system controller 10 turns ON power and the optical disc 2 is then loaded, processing by the system controller 10 shifts from the step SP2 to step SP3 as the result of the fact that affirmative result is obtained at the step SP2. It is to be noted that when power is turned OFF in repetition of the step SP2, processing by the system controller 10 directly shifts to step SP4 to complete this processing procedure.

At the step SP3, the system controller 10 drives the sled motor 21 to move the optical head 19 toward the innermost circumference of the optical head 19 to acquire reproduction result of the innermost circumferential side from the DVD signal processing unit 14 to thereby acquire data of VMG with respect to the optical disc 2 to which finalize processing has been implemented. On the contrary, in the case where the optical disc 2 is not yet caused to undergo finalize processing, information of RMA is acquired. Moreover, in the case where it is judged by the information of RMA whether or not data has been already recorded in the real time data recording area of the optical disc 2, the optical disc 2 is searched to acquire data of VTSI, temporary VMGI, VTSM VOBS of respective VTSs. Thus, similarly to the optical disc apparatus adapted for recording/reproducing ordinary DVD, the system controller 10 is adapted to acquire management information of the optical disc 2 necessary for recording/reproduction of the optical disc 2.

Here, temporary VMGI is temporary VMGI recorded along with VTSI at a time point when recording of one title is completed, and includes information of the number of VTSs and/or disc name recorded on the disc, and information of physical arrangement of VTS corresponding to 99 titles and/or title name, etc. In this temporary VMGI, there are included latest information with respect to all titles (VTS) which have been recorded until now at the time of recording of temporary VMGI. In the case where plural titles are recorded onto DVD-R, plural temporary VMGIs are recorded at plural portions. In this case, temporary VMGI located at the outermost circumferential side is the latest temporary VMGI. In this example, the temporary VMGI is data at the outside of the range of DVD video standard.

In this processing, the system controller 10 also together acquires data of UDF in addition to data of VMG Moreover, in the case where intermediate management information which will be described later is recorded in reproduction of the real time data recording area, the intermediate management information is also together acquired. Thus, the system controller 10 is adapted to together acquire management information of extended file which is not defined in the DVD-video format in such a manner to have ability to reproduce such extended file from the optical disc 2. The system controller 10 records, into memory included therewithin, a series of management information which have been acquired in this way and holds them. The management information is held by memory even if power is turned OFF.

Subsequently, processing by the system controller 10 shifts to step SP5 to judge whether or not eject operation of the optical disc 2 is instructed. When the affirmative result is obtained at this step, the system controller 10 instructs loading mechanism which is not shown to eject the optical disc 2. Thereafter, processing by the system controller 10 returns to the step SP2.

On the contrary, when instruction except for eject operation of the optical disc 2 is obtained from user, processing by the system controller 10 shifts from step SP5 to step SP6 to judge whether operation by user is operation to instruct recording (indicated by REC), operation to instruct reproduction (playback) (indicated by PB), or operation to instruct power supply to be turned OFF (indicated by Power Off). In the case where the operation by user is operation to instruct reproduction at this step, processing by the system controller 10 shifts from step SP6 to step SP7 to execute reproduction processing procedure which reproduces files recorded on the optical disc 2 to return to the step SP5.

On the contrary, in the case where the operation by user is an operation to instruct recording operation, processing by the system controller 10 shifts from step SP6 to step SP8 to execute recording processing procedure which records moving picture (image) or still picture (image) onto the optical disc 2 to return to the step SP5. In this example, in the case where the optical disc 2 is caused to undergo so-called finalize processing so that UDF and VMG are formed, recording processing procedure is omitted as the result of the fact that the optical disc 2 is processed so that data cannot be recorded and processing by the system controller 10 returns to the step SP5.

On the contrary, in the case where the operation by user is an operation to turn OFF power, processing by the system controller 10 shifts from step SP6 to step SP9 to execute processing for turning OFF power to shift to the step SP4 to complete the processing procedure.

In the recording processing procedure of processing procedures executed in this way, in the case where the optical disc 2 is DVD-R, the system controller 10 records files of moving picture (image) and still picture (image) by the INC system.

FIG. 7 is a diagram used for explanation of recording processing of moving picture file and still picture file by the INC system by taking, as an example, the case where the optical disc 2 is the so-called virgin disc on which any file is not recorded. As shown in FIG. 7A, the system controller 10 updates information of RMA which is acquired from the optical disc 2 and is held in the memory to thereby reserve R zone 1.

Moreover, as shown in FIG. 7A, in the case where moving picture (image) is recorded, the system controller 10 updates information of RMA to thereby reserve R zone 2 and Invisible R zone to sequentially record video data which are real data into Invisible R zone to generate VTSTT VOBS. Moreover, when the operation mode of picture recording is switched from the moving picture mode to the still picture mode by user so that picture recording start in the still picture mode is instructed, the system controller 10 generates VTSI BUP as shown in FIG. 7B, and generates VTSI, temporary VMGI and VTSM VOBS as shown in FIG. 7C to generate one VTS. In addition, in such a manner to become in correspondence with VTS generated in this way, the system controller 10 holds management information into memory, and updates information of RMA held in the memory.

Subsequently, in the case where moving picture (image) is recorded, the system controller 10 similarly updates information of RMA held in the memory to reserve R zone 2 and Invisible R zone thereafter to sequentially record real data into the Invisible R zone to generate VTSTT VOBS, and VTSI BUP, and to generate VTSI, temporary VMGI and VTSM VOBS to record management information into the memory in a manner to become in correspondence therewith to update information of RMA held in the memory.

Thus, in the case where the system controller 10 records moving picture by the INC system, it sequentially records titles similarly to the case by the conventional INC system. Moreover, in the case where optical disc 2 to which finalize processing has not yet been implemented is loaded and write-once operation is performed onto the optical disc 2, the system controller 10 executes similar processing from the end portion of title already recorded by data of RMA which is acquired at the step SP2 of FIG. 6 and is held in the memory to thereby perform write-once operation of moving picture (image) which is photographic result.

On the contrary, in the finalize processing, UDF and VMG of R zone 1 are generated by management information which is generated and is held into the memory in this way to generate Lead-in and Lead-out. It is to be noted that it is a matter of course that in the case where write-once operation is performed with respect to the optical disc 2 to which finalize processing has not yet been implemented, data of UDF and VMG with respect to titles already recorded on the optical disc 2 are generated by VTSI, temporary VMGI, and VTSTT VOBS which have been acquired at the step of FIG. 6.

In a manner as stated above, the optical disc recording/reproducing apparatus 100 is adapted to record files of moving pictures (images) in accordance with the DVD video format by processing based on the INC system similar to the prior art.

On the contrary, in the case where still picture (image) is recorded, Invisible R zone is first reserved by updating of RMA held in memory as shown in FIG. 7E to sequentially records files EF of still pictures (images) which are extended file. Moreover, intermediate management information which are management information for temporarily performing management of still pictures (image) until the finalize processing are successively prepared in such a manner to become in correspondence with recording of the still picture file EF, and are held into included memory.

Further, when a desired number of still picture files are recorded and the operation mode of picture recording is switched by user from the still picture mode to the moving picture mode so that picture recording start in the moving picture mode is instructed, Invisible R zone is closed by updating of RMA held in the memory to reserve R zone 3 into an area succeeding to the still picture file. In addition, intermediate management information held in the memory is converted into information having format of recording onto the optical disc 2 to record the intermediate management information thus obtained into R zone 3 as shown in FIG. 7G.

Figure 8A:
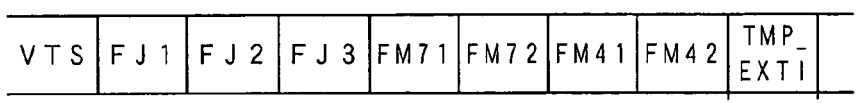
FIGS. 8A to 8D are views used for explanation of intermediate management information.
Figure 8B:
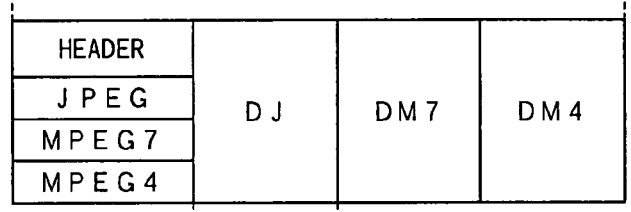

Here, the intermediate management information is management information necessary for reproduction of extended file, and consists of attribute information by extension indicating attribute of extended file, address information indicating recording position, information of file size, and time information recorded on the optical disc 2, etc. As shown in FIG. 8, intermediate management information are collectively recorded every attributes of extended files continuously recorded. Namely, as shown in FIG. 8B, the intermediate management information consists of header, and file management information DJ, DM7, DM4 every attributes. For example, as shown in FIG. 8A, in the case where three files FJ1, FJ2, FJ3 by JPEG are recorded by instruction of user thereafter to subsequently record two files FM71, FM72 by MPEG7 to further subsequently record two files FM41, FM42 by MPEG4, the intermediate management information is adapted so that recording of these three kinds of files is indicated by recording of header, and recording positions of respective file management information DJ, DM7, DM4 succeeding thereto are indicated by recording of the header. Here, symbols DJ, DM7, DM4 respectively indicate file management information by JPEG, MPEG7, MPEG4.

Figure 8C:
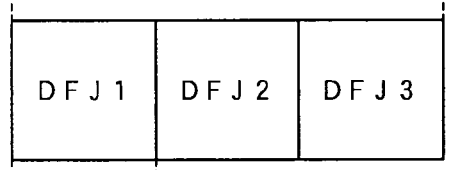
Figure 8D:
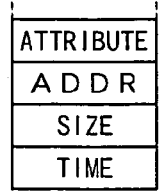

As shown in FIG. 8C, file management information DJ for each attribute are recorded every management information DFJ1, DFJ2, DFJ3 of respective files. As shown in FIG. 8D, attribute information of corresponding extended file, address information ADDR, information of size and time information, etc. are assigned to the management information DFJ1 of each file.

In this embodiment, at the optical disc recording/reproducing apparatus 100, still picture file by JPEG is applied as the extended file so that only file management information DJ shown in FIG. 8B is prepared with respect to such file management information every attribute in the optical disc 2 recorded by the optical disc recording/reproducing apparatus 1.

Thus, even in the case where files except for moving picture are recorded onto the optical disc 2, the system controller 10 records files and management information corresponding thereto into user area in the state where they form a set. Moreover, at this time, in the case where file to be recorded onto the optical disc 2 is file of moving picture, management information, files and backup information for management information are sequentially recorded in a manner such that they are successive, whereas in the case where file of still picture which is file except for moving picture is recorded onto the optical disc 2, files and management information are sequentially recorded to thereby switch recording format of management information in accordance with attribute of file.

When the system controller 10 records the intermediate management information temporary VMGI in this way, it records the intermediate management information temporary VMGI into included memory to hold such information. Moreover, in the case where the intermediate management information temporary VMGI is recorded in this way thereafter to record file by still picture for a second time, when the system controller 10 sequentially records extended files in a manner similar to the above, and the operation mode of picture recording is then switched from the moving picture mode to the still picture mode so that picture recording start in the still picture mode is instructed, it records the intermediate management information temporary VMGI to reserve Zone and Invisible Rzone as shown in FIG. 7H to form VTSTT VOBS and VTSI BUP to generate VTSI, temporary VMGI, VTSM VOBS as shown in FIG. 7I to thereby generate VTS subsequently to intermediate management information temporary VMGI as shown in FIG. 7J.

Thus, in the optical disc recording/reproducing apparatus 100, files by moving picture by the DVD video format and files by still picture which are not defined by the DVD video format are recorded along with management information. With respect to the optical disc 2 in which recording has been made in this way, in the case where the real time data recording area is searched by RMA, in the conventional optical disc apparatus adapted for supporting only the DVD video format, only VTSI and VTSTT VOBS which are management information of VTS are detected, and extended files by still picture, etc. and intermediate management information for extended file which have not been defined by any means are not recognized as significant file by any means. On the contrary, in optical disc apparatuses adapted for supporting extended files of this kind, extended files by still picture, etc. and intermediate management information for extended files are also recognized in addition to management information of VTS.

Thus, the system controller 10 is adapted to record extended files in such a manner that any influence or effect is not given to reproduction of moving picture in the conventional optical disc apparatus.

Thus, when it is instructed by user that the optical disc 2 on which extended files have been recorded in this way is caused to undergo finalize processing, the system controller 10 prepares, as shown in FIG. 7K, data of UDF from management information (VTSI, temporary VMGI, VTSTT VOBS) of all titles prepared in this way, and intermediate management information of all extended files to record the data thus prepared onto the optical disc 2. Further, the system controller 10 generates data of VMG only from management information (VTSI, temporary VMGI, VTSTT VOBS) of all titles to record the data thus generated onto the optical disc 2. In this example, in generation of these data of UDF and VMG, those data are prepared from intermediate management information, etc. held in the memory. In addition, when the system controller 10 records UDF and VMG in this way, it prepares Lead-in and Lead-out. In this example, the system controller 10 executes, by output to the DVD signal processing unit 14 of corresponding data, such recording of UDF and VMG, preparation of Lead-in and Lead-out, and recording of intermediate management information.

Figure 9:
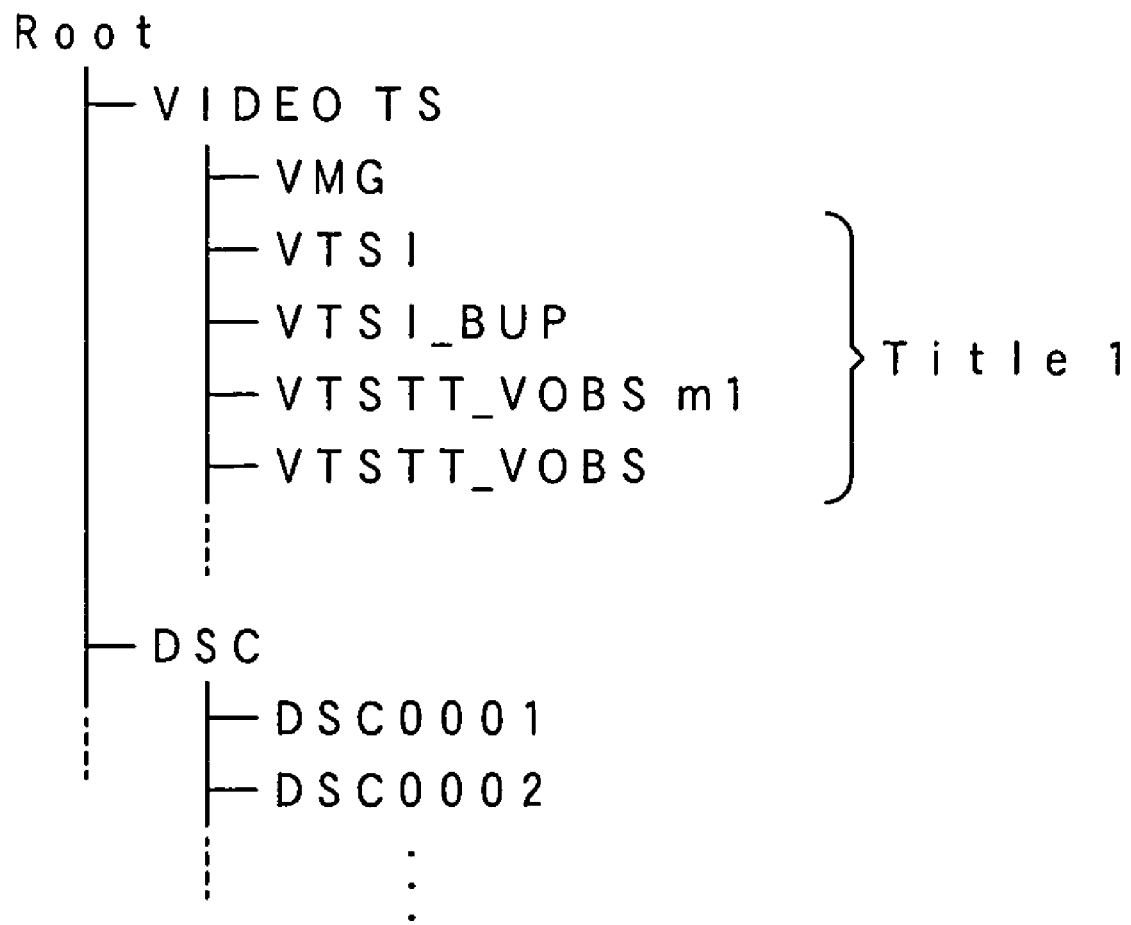
FIG. 9 is a diagram used for explanation of directory structure in the optical disc.

Thus, in this embodiment, management information are recorded in order to also recognize extended file to provide access thereto with respect to UDF which is management information for computer, whereas information according to extended files are not recorded by any means with respect to VMG which is management information for DVD reproduction. In this processing, as shown in FIG. 9, the system controller 10 prepares UDF so as to display only extended files at different folder which is the same hierarchy as that of the title by DVD in accordance with reproduction of UDF by computer. Moreover, with respect to the intermediate management information which has been described with reference to FIG. 8, descriptions of file name and/or address information of recording position, etc. are omitted to prepare UDF. It is to be noted that it is a matter of course to prepare UDF in a manner to permit access to respective extended files similarly to files such as VTSI, temporary VMGI and VTSM VOBS, etc. which constitute the title. Thus, in this embodiment, in the case where reproduction (playback) is performed by computer, user is prevented from looking at file of temporary intermediate management information which is not significant by any means in reproduction of the optical disc 2 in the computer to improve convenience in use accordingly.

Thus, in the conventional optical disc apparatus adapted for reproducing DVD, only moving picture files recorded on the optical disc 2 by recording of VMG are reproduced. On the contrary, in this optical disc recording/reproducing apparatus 100, the system controller 10 performs a control of the entire operation so as to acquire, at step SP3 of FIG. 6, data of UDF and VMG, and to access, with respect to extended files, respective files by UDF. Thus, extended files can be also reproduced. In FIG. 9, Root is root directory, VIDEO TS is folder of moving picture (image), and DSC is folder of extended file. In addition, DSC0001 and DSC0002 are respectively extended files.

Figure 10:
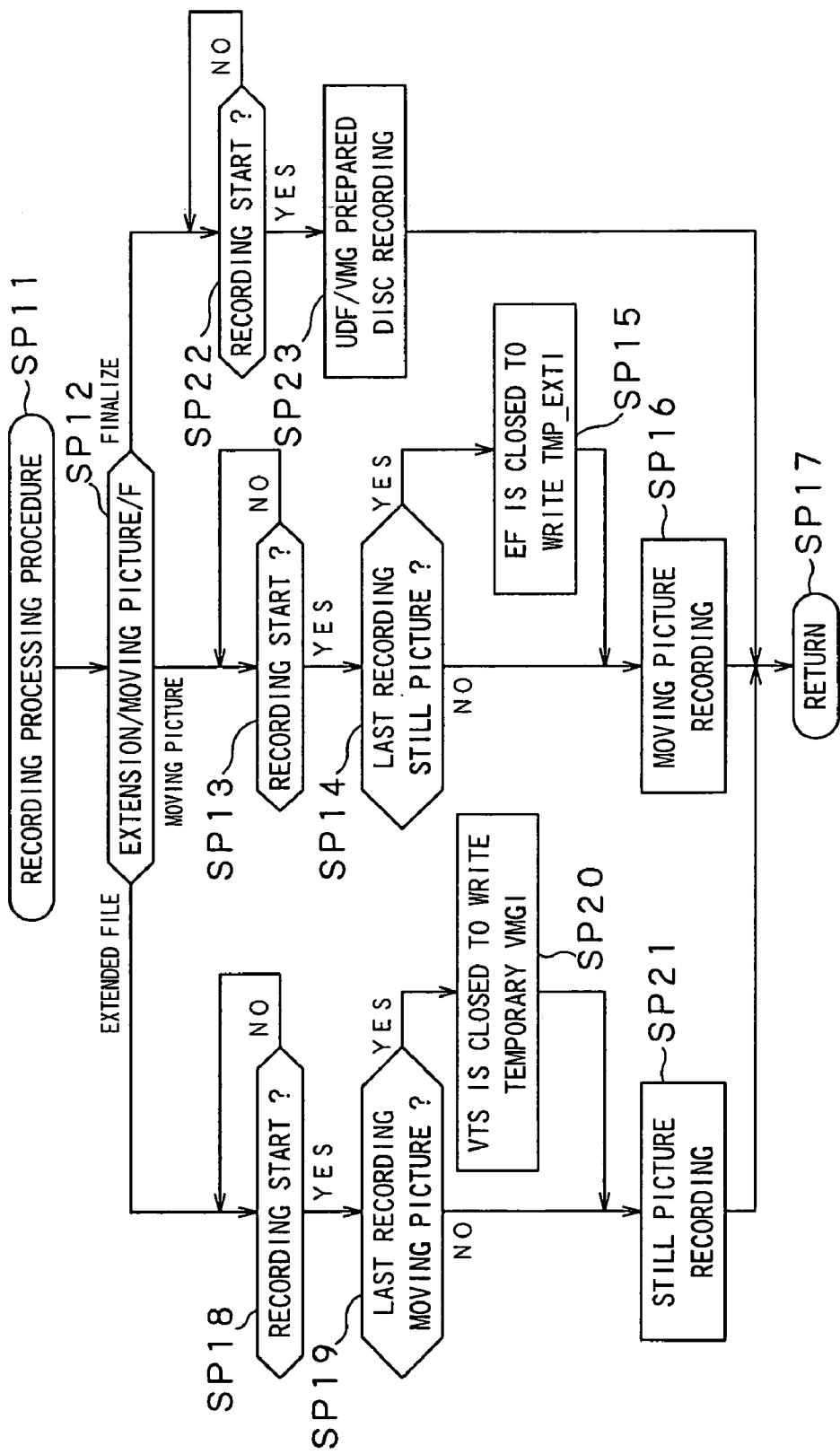
FIG. 10 is a flowchart showing the procedure of recording processing in the optical disc recording/reproducing apparatus shown in FIG. 5.

FIG. 10 is a flowchart showing the recording processing procedure which has been described with reference to FIG. 7. When the recording processing procedure is started, processing by the system controller 10 shifts from step SP11 to step SP12 to judge whether instruction of recording by user is instruction according to recording of moving picture, instruction according to recording of still picture, or instruction according to finalize processing.

Here, in the case where the instruction of recording by user is instruction according to recording of moving picture, processing by the system controller 10 shifts from step SP12 to step SP13 to judge whether or not recording start of moving picture by start/stop button of the operation unit 11 is instructed by user. When the denial result is obtained at this step, the system controller 10 repeats step SP13. On the contrary, when the affirmative result is obtained, processing by the system controller 10 shifts from the step SP13 to step SP14 to judge with reference to information within the memory whether or not the operation mode at the last recording time is moving picture mode. In the case where the denial result is obtained at this step, i.e., in the case where the operation mode at the last recording time is still picture mode, processing by the system controller 10 shifts from the step SP14 to step SP15. The system controller 10 records intermediate management information TMP_EXTI for performing management of extended file by still picture file as has been explained with reference to FIG. 7 thereafter to reserve Zone and Invisible R zone as shown in FIG. 7H to form VTSTT VOBS and VTSI BUP. Processing by the system controller 10 shifts to step SP16 to generate VTSI, temporary VMGI and VTSM VOBS to thereby start, as shown in FIG. 7J, recording operation in the moving picture mode where VTS#2 is recorded subsequently to the intermediate management information TMP_EXTI. Further, in the case where the affirmative result is obtained at the step SP14, i.e., the operation mode at the last recording time is moving picture mode, processing by the system controller 10 shifts to step SP16 to continue recording of moving picture as VTS previously recorded.

Further, in the case where recording of still picture is instructed by user, processing by the system controller 10 shifts from step SP12 to step SP18 to judge whether or not recording start of still picture by shutter button of the operation unit 11 is instructed by user. When the denial result is obtained at this step, the system controller 10 repeats the step SP18. On the contrary, when the affirmative result is obtained, processing by the system controller 10 shifts from step SP18 to step SP19 to judge with reference to information within the memory whether or not the operation mode at the last recording time is still picture mode. In the case where the denial result is obtained at this step, i.e., in the case where the operation mode at the last recording time is moving picture mode, processing by the system controller 10 shifts from step SP19 to step SP20 to record intermediate management information temporary VMGII for performing management of moving picture file as has been explained with reference to FIG. 7 to thereby close VTS to reserve Zone and Invisible R zone. Thus, processing by the system controller 10 shifts from SP20 to step SP21 to record extended file by still picture file as shown in FIG. 7D. Furthermore, in the case where the affirmative result is obtained at the step SP19, i.e., in the case where the operation mode at the last recording time is still picture mode, processing by the system controller 10 shifts to step SP21 to continue recording of still picture as still picture file EF previously recorded.

On the contrary, in the case where instruction of recording by user is instruction according to finalize processing, processing by the system controller 10 shifts from step SP12 to step SP22 to judge whether or not start of recording is instructed by user. When the denial result is obtained at this step, the system controller 10 repeats the step SP22. On the contrary, when the affirmative result is obtained, processing by the system controller 10 shifts from the step SP22 to step SP23 to execute finalize processing as has been explained with reference to FIG. 7 thereafter to shift to step S17 to complete this processing procedure.

Thus, the optical disc recording/reproducing apparatus 100 is adapted to record files by moving pictures by the DVD video format and files by still picture which are not defined by the DVD video format along with management information. With respect to the optical disc 2 recorded in this way, in the case where the real time data recording area is searched by RMA, in the conventional optical disc apparatus adapted for supporting only the DVD video format, only VTSI and VTSTT VOBS which are management information of VTS are detected, and extended files by still picture, etc. and intermediate management information for extended files which are not defined are not recognized as significant file by any means. On the contrary, in the optical disc apparatus adapted for supporting extended files of this kind, extended files by still picture and intermediate management information for the extended files can be also recognized in addition to management information for VTS.

Figure 11:
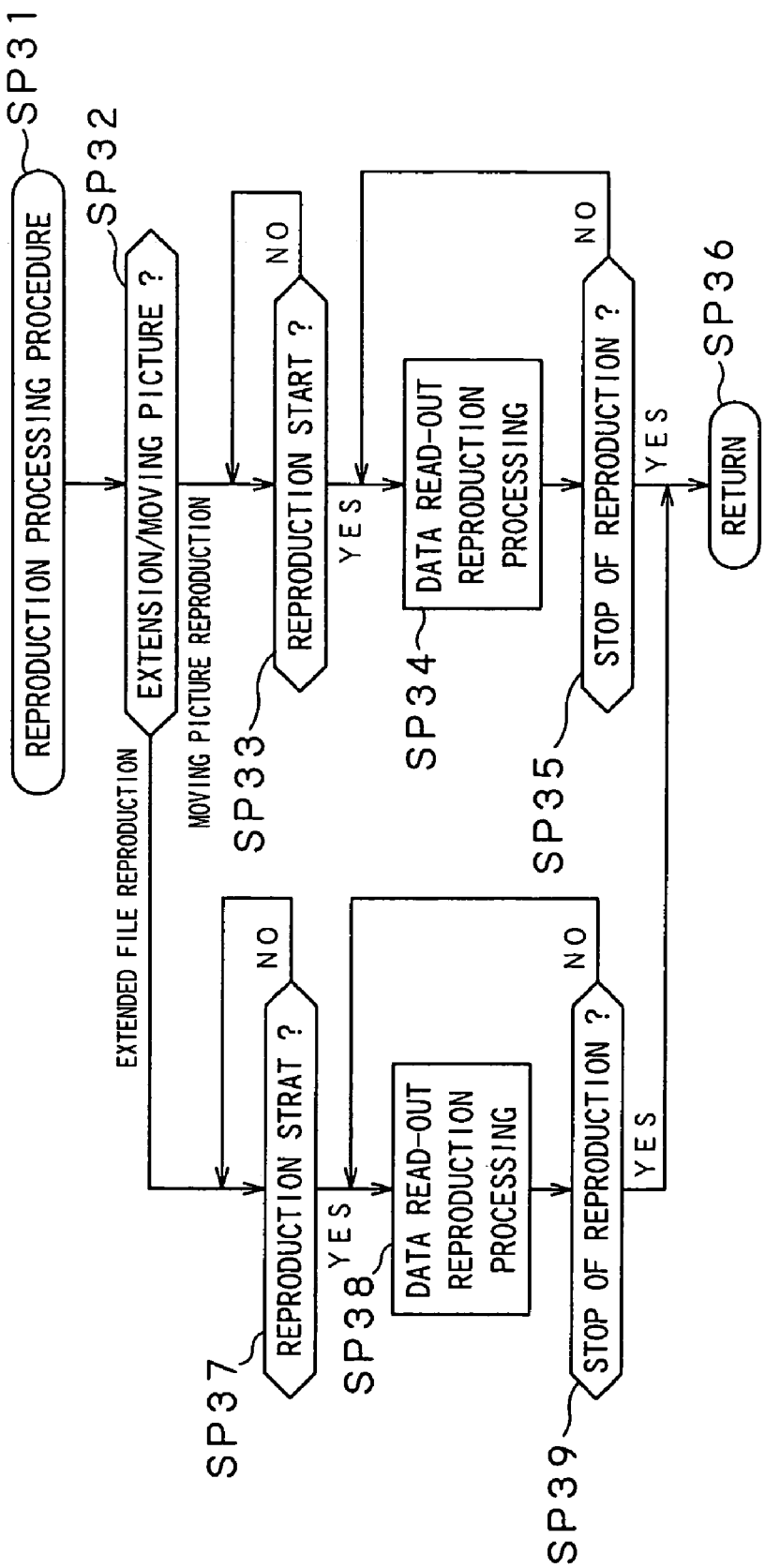
FIG. 11 is a flowchart showing the procedure of reproduction processing in the optical disc recording/reproducing apparatus shown in FIG. 5.

On the contrary, FIG. 11 is a flowchart showing the reproduction processing procedure which has been described with reference to FIG. 7. When the reproduction processing procedure is started, processing by the system controller 10 shifts from step S31 to step S32 to judge whether instruction of reproduction by user is instruction according to recording of moving picture, or instruction according to recording of still picture.

In the case where the instruction of reproduction by user is instruction according to reproduction of moving picture at this step, processing by the system controller 10 shifts from the step S32 to step SP33 to judge whether or not start of reproduction (playback) is instructed by user. When the denial result is obtained at this step, the system controller 10 repeats the step SP33. On the contrary, when the affirmative result is obtained, processing by the system controller 10 shifts from step SP33 to step SP34. At this step, the system controller 10 controls the entire operation with management information recorded and held in the memory being as reference in such a manner to reproduce file of moving picture instructed by user.

Namely, in the case where the optical disc 2 is an optical disc to which finalize processing has been implemented, recording position of corresponding file is detected by data of VMG held in the memory to instruct reproduction from the recording position with respect to respective components of the optical disc recording/reproducing apparatus 100. On the contrary, in the case where the optical disc 2 is an optical disc to which finalize processing has not been implemented, recording position of corresponding file is detected by VTSI, temporary VMGI, VTSTT VOBS of respective titles which are held in the memory to instruct reproduction from the recording position with respect to respective components of the optical disc recording/reproducing apparatus 100.

When reproduction is instructed in this way, processing by the system controller 10 subsequently shifts to step SP35 to judge whether or not Stop of reproduction is instructed by user. When the denial result is obtained at this step, processing by the system controller 10 returns to the step SP34. Thus, the system controller 10 repeats processing procedure of step SP34→step SP35→step SP34 to sequentially reproduce files of moving pictures instructed by user. On the contrary, when the affirmative result is obtained at the step SP35, the operation of reproduction is completed. Thus, processing by the system controller 10 shifts to step SP36 to complete this processing procedure.

On the contrary, in the case where instruction of reproduction by user is instruction according to reproduction of extended file, processing by the system controller 10 shifts from step SP32 to step SP37 to judge whether or not start of reproduction is instructed by user. When the denial result is obtained at this step, the system controller 10 repeats the step S37. On the contrary, when the affirmative result is obtained, processing by the system controller 10 shifts from step SP37 to step SP38.

Here, in the case where the optical disc 2 is an optical disc to which finalize processing has been implemented, the system controller 10 detects recording position of corresponding file by data of UDF held in the memory to instruct reproduction from the recording position with respect to respective components of the optical disc recording/reproducing apparatus 100. On the contrary, in the case where the optical disc 2 is an optical disc to which finalize processing has not been implemented, the system controller 10 detects recording position of corresponding file from the intermediate management information held in the memory to instruct reproduction from the recording position with respect to respective components of the optical disc recording/reproducing apparatus 100.

When reproduction (playback) is instructed in this way, processing by the system controller 10 subsequently shifts to step SP39 to judge whether or not Stop of reproduction is instructed by user. When the denial result is obtained at this step, processing by the system controller 10 returns to the step SP3 8. Thus, the system controller 10 repeats processing procedure of the step SP38→the step S39→the step SP38 to sequentially reproduce files of still pictures designated by user. On the contrary, when the affirmative result is obtained at the step SP39, the system controller 10 completes the operation of reproduction. Thus, processing by the system controller 10 shifts to step S36 to complete the processing procedure.

Thus, in this embodiment, the system controller 10 constitutes management information generating means which generates management information of file to be recorded. Moreover, the DVD signal processing unit 14, the random access memory 15, the analog front end unit 16, the motor amplifier unit 18, the optical head 19 and the spindle motor 20 constitute recording means which records file and management information corresponding to the file into user area of the optical disc 2 in such a manner that they form a set. Further, the system controller 10 constitutes control means which controls operations of the management information generating means and the recording means, and constitutes reproduction means for reproducing files of respective attributes recorded on the optical disc on the basis of management information recorded by set with the file in this way together with the compression/expansion processing unit 6, the header information processing unit 7, the DVD signal processing unit 14, the random access memory 15, the analog front end unit 16, the motor amplifier unit 18, the optical head 19, and the spindle motor 20.

In the above-mentioned configuration, in the optical disc recording/reproducing apparatus 100, when the optical disc is loaded by user in the state where power is turned ON, or when power is turned ON in the state where the optical disc is loaded, the optical head 19 moves toward the inner circumferential side of the optical disc 2 by drive of the sled motor 21 through the DVD signal processing unit 14 and the motor drive control unit 18 by the system controller 10. Further, laser beams are irradiated onto the optical disc 2 by the optical head 19, and light receiving results by the optical head 19 of return light are sequentially processed at the analog front end unit 16 and the system controller 10. Thus, processing of the tracking control and the focus control are executed by control of the optical head 19 through the DVD signal processing unit 14 and the motor drive control unit 18 by processing of the system controller 10. Moreover, data recorded on the optical disc 2 are reproduced in accordance with processing by the DVD signal processing unit 14 of light receiving result. At the optical disc recording/reproducing apparatus 100, by the series of processing, various information recorded at the inner circumferential side of the optical disc 2 are acquired at the system controller 10, and are held into the memory included within the system controller 10.

In the case where the optical disc 2 is reproduction only optical disc prepared by stamper, and in the case where the optical disc 2 is finalize-processed optical disc on which only moving picture files are recorded, data of VMG which is management information for DVD player recorded at the inner circumferential side of the optical disc 2 are acquired at the system controller 10 by the series of processing. Thus, in the optical disc recording/reproducing apparatus 100, when reproduction of the optical disc 2 is instructed by user, the optical head 19 seeks until the recording position of a title that user desires by drive of the spindle motor 20 through the DVD signal processing unit 14 and the motor drive control unit 18 in accordance with the data of VMG, and light receiving results of the optical head 19 are sequentially processed at the DVD signal processing unit 14, the header information processing unit 7 and the compression/expansion processing unit 6 in the state where the tracking control and the focus control are performed by light receiving result of the optical head 19 so that video data based on moving picture are reproduced. Namely, a reproduction signal of which signal level changes in accordance with pit train of the optical disc 2 which is light receiving result is processed at the analog front end unit 16 so that reproduction data is generated. The reproduction data thus obtained is caused to undergo decode processing, deinterleave processing and error correction processing at the DVD signal processing unit 14. Moreover, the reproduction data which has been caused to undergo the error correction processing is inputted to the header information processing unit 7, at which header is removed therefrom. Information of the header is notified to the system controller 10. Further, subsequently thereto, the information of header is inputted to the compression/expansion processing unit 6, and is separated into video data and audio data at the multiplex processing section 63. With respect to the video data, data compression by MPEG is released by the video processing unit 8. The video data thus obtained is displayed by the monitor unit 12, or is outputted to external equipment from the video/audio encoder 13. On the contrary, the audio data is caused to undergo data expansion at the audio processing section 62. Thereafter, the audio data thus obtained is monitored by the monitor unit 12, or is outputted to the external equipment by the video/audio encoder 13.

On the contrary, in the case where the optical disc 2 is recordable virgin disc, data of RMA of the optical disc 2 is acquired at the system controller 10 by access of the optical disc 2 in power ON state at the time of loading of the optical disc 2. In the optical disc recording/reproducing apparatus 100, when photographic mode of moving picture is selected by user, in the case where the optical disc 2 is DVD-R, areas for forming UDF and VMG are ensured by reservation of R zone 1 by updating of RMA held in the memory at the system controller 10.

When start of picture recording is instructed by user in this state, video data and audio data are sequentially inputted from the video input unit 3 and the audio input unit 5. With respect to the video data, processing of data compression is executed at video processing section 61 by MPEG. With respect to the audio data, processing of data compression is executed at the audio processing section 62. Further, these video and audio data to which data compression has been implemented are caused to undergo multiplex processing by the multiplex processing section 63. Header is added to data of that processed result by the header information processing unit 7. Further, at the succeeding DVD signal processing unit 14, error correction code is added. Thereafter, interleave processing and encoding processing are performed. In accordance with data of the processed results, light quantity of laser beams irradiated from the optical head 19 onto the optical disc 2 is raised (increased) by the analog front end unit 16. Thus, pit trains are successively formed at the optical disc 2 so that video data by moving pictures are sequentially recorded.

In the optical disc recording/reproducing, apparatus 100, when the operation mode of picture recording is switched by user from moving picture mode to still picture mode so that picture recording start in the still picture mode is instructed, a series of processing at the compression/expansion processing unit 6, etc. are caused to undergo stop control by the system controller 10 so that recording of video data is stopped. Subsequently, management information for files by moving picture recorded in this way is recorded onto the optical disc. Namely, in the optical disc recording/reproducing apparatus 100, management information is generated by the system controller 10 on the basis of position information, information of file size and/or information of recording date, etc. where moving pictures (images) are recorded in this way. The management information thus generated is outputted to the DVD signal processing unit 14 in such a manner that it is recorded subsequently to video data, and is recorded onto the optical disc 2. Thus, areas of VTSI BUP are formed.

Thus, in the optical disc recording/reproducing apparatus 100, video data by moving picture is recorded by one title. Thus, in the optical disc recording/reproducing apparatus 1, in the case where file by moving picture is recorded, management information and files are recorded by the DVD video format which is the format where management information by VTSI, management information by temporary VMGI, management information by VTSM VOBS, files, and management information by VTSI BUP are successive.

In the optical disc recording/reproducing apparatus 100, in the case where recording of moving picture is subsequently instructed by user, titles are successively recorded onto the optical disc 2 by repetition of similar processing. Moreover, in such cases that an optical disc where titles are successively recorded in this way and finalize processing has not been yet implemented is loaded, or the like, management information recorded in a manner paired with title in this way is acquired by scan of the optical disc 2 performed by making reference to data of RMA along with data of RMA in the beginning. The management information thus acquired is held in the memory of the system controller 10. Thus, titles continued from the end of the title detected by scan of the optical disc are recorded.

In the optical disc recording/reproducing apparatus 100, when titles are recorded in this way, and finalize processing is instructed by user, data of UDF and VMG are generated by management information which forms a set with titles recorded in the memory. These data are recorded in the inner circumferential side area ensured at the optical disc 2, and Lead-in and Lead-out are formed. Thus, this optical disc is set so that it can be reproduced by DVD player corresponding to only ordinary DVD format.

On the contrary, in the case where recording mode of still picture is selected by user, areas of UDF and VMG are ensured by updating of RMA held in the memory and by padding similarly to the case of the moving picture at the virgin disc. Moreover, in the optical disc recording/reproducing apparatus 100, the operation mode of the image pick-up means is switched into the mode of still picture, and the operation mode at the compression/expansion processing unit 6 is switched into the operation mode of data compression by JPEG.

When picture recording start of still picture is instructed by user in this state, video data by still picture inputted from the video input unit 3 is caused to undergo data compression by the format of JPEG at the video processing section 61 of the compression/expansion processing unit 6. Thereafter, the video data thus obtained and audio data outputted from the audio processing section 62 are caused to undergo multiplex processing at the multiplex processing section 63. Thus, in the optical disc recording/reproducing apparatus 100, data to be recorded is generated by video data by still picture in place of video data by moving picture. The data thus generated are sequentially recorded onto the optical disc 2 similarly to the case by moving picture.

In the optical disc recording/reproducing apparatus 100, in recording of moving pictures, areas of VTSI, temporary VMGI, VTSM VOBS are first ensured to record real data, whereas in the recording of still picture, real data by still picture are recorded without ensuring such areas. Moreover, when recording of subsequent still picture is instructed by user, subsequent still picture is recorded onto the optical disc 2 in a manner similar to the above. In addition, recording positions of respective files, etc. are recorded into memory every these recording operations.

In the optical disc recording/reproducing apparatus 100, when files by still picture are recorded onto the optical disc by a desired number of of files in this way so that recording stop of still picture is instructed by switching, etc. of the operation mode by user, management information by recording position, etc. held in the memory are recorded into succeeding areas by these plural files as temporary intermediate management information until finalize processing. Thus, in the optical disc recording/reproducing apparatus 100, in the case where files except for moving picture are recorded, file and management information are recorded so that there results order of file and corresponding management information. Thus, recording format of file and management information is switched in dependency upon file to be recorded.

Thus, in the optical disc recording/reproducing apparatus 100, files of still picture, etc. which are not defined by the DVD video format can be also recorded onto the optical disc 2. Moreover, in the case where the optical disc 2 recorded in this way is loaded at the optical disc reproducing apparatus adapted for supporting only ordinary DVD video format, management information recorded in accordance with the DVD video format such as VTSI, etc. is detected by search at the time of loading, etc. and VTS is reproduced by the management information, thereby making it possible to prevent any influence or effect from being given to reproduction of moving picture with respect to files of still picture, etc. and corresponding management information which are recorded in this way. Thus, in the optical disc recorded in this way, it becomes possible to reproduce files of moving pictures by the ordinary DVD player.

On the contrary, in accordance with the optical disc recording/reproducing apparatus adapted for also supporting such files except for moving picture, it becomes possible to also reproduce files of still picture. Namely, in the case where such optical disc 2 is loaded, in the optical disc recording/reproducing apparatus 100, not only data of VTS, VTSM VOBS, but also intermediate management information of still picture file are reproduced in accordance with the search of the optical disc 2 which is performed in the beginning, and are held into the memory of the system controller 10.

Thus, it is possible to offer, to user, titles, etc. of moving pictures and still pictures recorded on the optical disc 2 by, e.g., instruction of user. Moreover, in the case where user instructs reproduction of moving picture by instruction of reproduction by user, corresponding moving picture files are reproduced in a manner similar to the above with respect to the reproduction only optical disc by data of VTS and VTSM VOBS.

On the contrary, in the case where reproduction of still picture file is instructed by user, recording positions, etc. of corresponding files are detected by intermediate management information held in the memory, and data recorded on the optical disc 2 are sequentially reproduced by the detection result. Thus, the data thus reproduced are processed by path similar to that of reproduction data by moving picture. In the optical disc recording/reproducing apparatus 100, in the case where reproduction data by still picture are processed in processing of the reproduction data, the processing of the video processing unit 8 is switched by the system controller 10 in such a manner to perform data expansion of video data which has been caused to undergo data compression by the JPEG. Thus, it becomes possible to confirm video data by still picture by the monitor unit 12 to further output such video data to external equipment by the video/audio encoder 13.

In such files by still picture, etc., file size is generally small as compared to files by moving picture. On the contrary, in the optical disc recording/reproducing apparatus 100, as shown in FIG. 8, such intermediate management information serving as management information are collectively prepared and recorded by plural files. Thus, in the optical disc recording/reproducing apparatus 100, in recording extended files by such still picture file, etc., it is possible to reduce an increase of recording area by recording of file for management.

Further, in the case where plural files are collectively recorded in this way, they are collectively recorded every kinds of files which are attribute of file. Thus, it becomes possible to simplify search processing and finalize processing, etc.

Thus, in the optical disc recording/reproducing apparatus 100, files of moving pictures and still pictures are sequentially recorded by operation of user with respect to the so-called virgin disc, optical disc in which only moving pictures are recorded and finalize processing is not yet performed, and/or optical disc in which files of moving pictures and still pictures are recorded and finalize processing is not yet performed.

On the contrary, when finalize processing is instructed by user with respect to the optical disc on which moving pictures and still pictures are recorded in this way, data of UDF for computer is generated by management information and intermediate management information which are acquired from the optical disc and held in the memory, and management information and intermediate management information which are prepared by recording of moving picture and still picture and are held in the memory. The data thus generated is recorded into an area ensured in advance at the optical disc 2. In addition, VMG data for DVD player is generated only from management information for moving picture file, and is recorded onto the optical disc 2 in a manner stated above.

Thus, in the optical disc recording/reproducing apparatus 100, management information by set are collectively recorded, with respect to all files recorded on the optical disc 2, in the UDF area which is first management recording area of the management information recording area of the optical disc 2, whereas management information by set are collectively recorded, only with respect to moving picture file which is file of specific attribute recorded on the optical disc, in the VMG area for DVD which is the second management information recording area.

Thus, in the case where the optical disc to which finalize processing has been implemented in this way is reproduced by the DVD player, files recorded on the optical disc 2 are reproduced with VMG area for DVD being as reference, whereby moving pictures by the DVD video format can be securely reproduced without giving any influence or effect on reproduction of moving pictures with respect to recording of files of still pictures, etc.

Further, in the case where the optical disc to which finalize processing has been implemented is reproduced by computer, UDF is file management format corresponding to the file management system of computer. In the computer, as shown in FIG. 9, respective files are reproduced by UDF, whereby not only files of moving picture, but also files of still pictures, etc. can be reproduced and utilized.

In accordance with the above-mentioned configuration, format of management information recorded in a manner paired with file is switched in dependency upon attribute of file, thereby making it possible to also record, e.g., files of still pictures, etc. except for moving picture.

Further, files of respective attributes recorded on the optical disc are reproduced on the basis of management information except for moving picture recorded in this way, thereby making it possible to also reproduce files except for moving pictures to utilize the reproduced file.

In addition, by instruction by user, management information by set are collectively recorded, with respect to all files recorded on the optical disc, into the first management information recording area, and management information by set are collectively recorded, only with respect to files of specific attribute, into the second management information recording area. Thus, moving pictures can be reproduced by ordinary DVD player, and all files such as moving picture and/or still picture, etc. can be reproduced by computer.

It is to be noted that program corresponding to the flowchart shown in FIG. 10 may be recorded onto flexible disc or hard disc, etc. as recording medium to read out the program by using personal computer, etc. to execute such program to thereby permit the personal computer, etc. to be operative as the system controller 10.

Further, as described above, in the DVD-video format, there exists the restriction of 99 titles at the maximum as the number of titles (VTS) which can be recorded onto the optical disc. For this reason, when recording of data corresponding to 1 scene is performed on VTS basis, as far as 99 scenes can be only recorded onto single optical disc. For example, if it is assumed that 1 scene has been recorded in 5 to 6 seconds, there would result the state where recording can be made only in about eight minutes onto single disc.

On the other hand, in the DVD-video format, it is prescribed that VTSTT VOBS included in VTS can be divided into 99 reproduction units (hereinafter referred to as chapter (CHP)) at the maximum. In view of the above, when recording in one chapter (CHP) unit of data corresponding to one scene (hereinafter referred to as 1 scene/1 chapter (CHP) recording) is performed, recording of 99 (maximum number of VTS)×99 (maximum number of chapter (CHP))=9801 scenes can be performed onto single optical disc.

Moreover, when the conventional optical disc recording/reproducing apparatus is used to perform the above-described 1 scene/1 chapter (CHP) recording, work for automatically closing VTS would be performed when the number of chapters (CHP) becomes equal to 99. When VTS is closed in this way in the rewritable optical disc, erasing of the last (99-th) chapter (CHP) within VTS becomes difficult.

Figure 12:
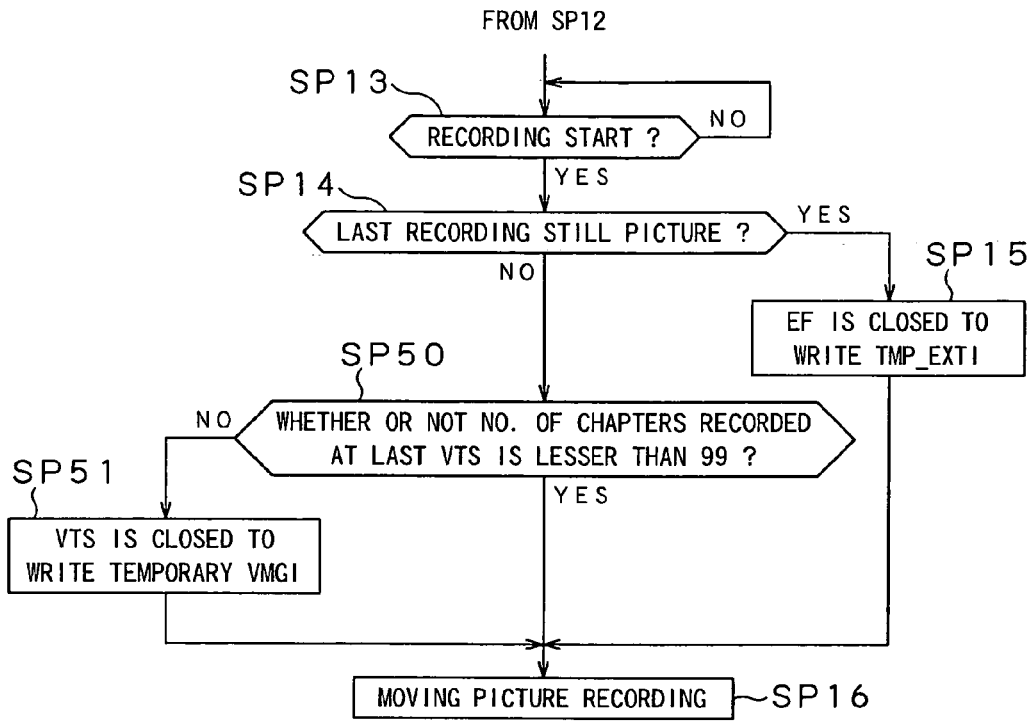
FIG. 12 is a flowchart showing the procedure of recording processing after 99 chapters have been recorded by the optical disc recording/reproducing apparatus to which the present invention has been applied.

In view of the above, in the optical disc recording/reproducing apparatus 100 according to the present invention, work for closing VTS is not performed at the time when the 99-th chapter (CHP) has been recorded, and work for closing VTS is performed when subsequent (100-th) chapter (CHP) is recorded (immediately before), thereby making it possible to easily perform erasing of the 99-th chapter (CHP). The operation for recording the 99-th chapter (CHP) thereafter to perform erasing of the 99-th chapter (CHP) by instruction of user will be explained below by using the flowchart of FIG. 12. It is to be noted that the fundamental operation of the embodiment according to the present invention is assumed to be performed in accordance with the flowchart shown in FIG. 10, and the same reference numerals are respectively attached to the same steps of FIG. 10 and their explanation will be omitted.

At step SP50, whether or not the number of chapters (CHP) recorded at the last VTS is lesser than 99 is discriminated. In the case where the number of chapters is 99 (NO) as the result of the discrimination, the last VTS is closed to write temporary VMGI (step SP51) thereafter to shift to step SP16 to perform moving picture recording operation. Moreover, in the case where the number of chapters is lesser than 99 (YES) as the result of the discrimination, processing shifts to the step SP16 as it is to perform moving picture recording.

Figure 13:
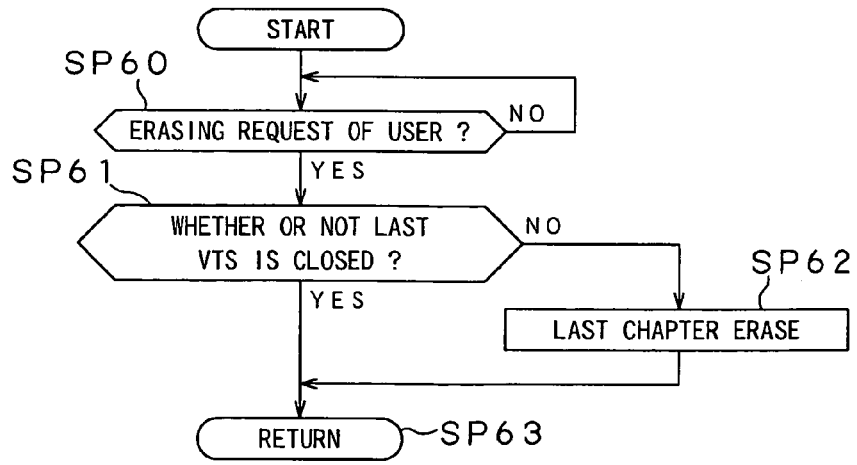
FIG. 13 is a flowchart showing the procedure for erasing the last chapter within VTS by the optical disc recording/reproducing apparatus to which the present invention has been applied.

Then, the operation for erasing the chapter (CHP) will be explained by using the flowchart shown in FIG. 13.

At step SP60, whether or not request for erasing chapter (CHP) is made from user is judged. In the case where request for erasing chapter (CHP) is made from user, processing proceeds to step SP61.

At the step ST61, whether or not the last VTS is closed is discriminated. In the case where it is discriminated that the last VTS is closed, processing to processing step SP63 without erasing any chapter to return to the steady state. Moreover, in the case where it is discriminated that the last VTS is not closed, processing proceeds to step SP62.

At the step SP62, the last chapter (CUP) is erased. After the chapter (CHP) is erased, processing proceeds to step SP63 to return to the steady state.

The optical disc recording/reproducing apparatus 100 constituted in this way performs work for closing VTS when the subsequent chapter (CHP) is recorded (immediately before) without performing work for closing VTS when the last chapter (CHP) of VTS is recorded, thereby making it possible to easily perform erasing of the last chapter (CHP) of VTS.

It is to be noted that the present invention is not limited to the above-described preferred embodiments which have been explained with reference to the attached drawings, and not only optical disc, but also recording medium such as magnetic disc and/or magnetic tape, etc. may be applied as the recording medium, and it should be therefore understood by those ordinarily skilled in the art that various modifications, alternative constructions or equivalents can be implemented without departing from the scope and spirit of the present invention as set forth by appended claims.

INDUSTRIAL APPLICABILITY

As stated above, in accordance with the present invention, it is possible to provide disc recording method, disc recording apparatus and optical disc adapted so that such a control is performed to switch recording format of file and management information with respect to user area in accordance with attribute of the file to record management information in previous recording format onto optical disc when start of recording in new recording format is instructed to close recorded file in the previous recording format to start recording in new recording format to thereby successively record VTSs in, e.g., DVD video format so that seamless reproduction can be made, and to have ability to also record files such as still picture, etc. except for moving picture, thus making it possible to prepare extended area while continuing areas of VTS as far as possible.

The invention claimed is:

1. A recording method of recording a file to be recorded and management information for the file into a user area of a recording medium so that the file and the management information form a set, the recording method comprising:
  switching recording format of the file and the management information with respect to the user area in accordance with an attribute of the file;
  recording, onto the recording medium, management information in a previous recording format when start of recording in a new recording format is instructed, and closing the recorded file in the previous recording format to start recording in the new recording format; and
  erasing a unit file before management information corresponding to the unit file is recorded onto the recording medium by the recording step for a management information recording area,
  wherein the erasing step discriminates whether a last VTS (Video Title Set) recorded on the recording medium is closed to erase the last unit file recorded on the recording medium by instruction of a user only when the VTS is not closed.

2. The recording method as set forth in claim 1,
  wherein when the file is a file of moving picture, the recording format of the file and the management information is DVD video format, the recording medium is DVD-R (DVD-Recordable), the file is VTS (Video Title Set) in the DVD video format, and the management information is VMGI (Video Manager Information) in the DVD video format, the recording method further comprising:
  performing management of DVD video file by temporary VMGI, and
  performing management of an extended file except for DVD video file by intermediate management information (TMP_EXTI).

3. The recording method as set forth in claim 1, further comprising:
  a recording step for recording the management information recorded to form a set with the file into the management information recording area of the recording medium,
  wherein the recording step comprises:
    collectively recording the management information by the set with respect to all files recorded on the recording medium into a first management information recording area of the management information recording area, and
    collectively recording the management information by the set with respect to the file of a specific attribute recorded on the recording medium into a second management information recording area of the management information recording area.

4. The recording method as set forth in claim 3,
  wherein the file to be recorded is recorded onto the recording medium by a file partitioned in predetermined reproduction units in accordance with the recording format, thereby forming the unit file.

5. The recording method as set forth in claim 4, wherein the erasing step erases the last unit file recorded on the recording medium by instruction of user.

6. The recording method as set forth in claim 3, wherein the first management information recording area is an area corresponding to a file management system of a processor, and
  the second management information recording area is an area corresponding to a file management system of DVD video format.

7. A recording apparatus comprising:
  management information generating means for generating management information for a file to be recorded;
  recording means for recording, into a user area of a recording medium, the file and the management information corresponding to the file so that the file and the management information form a set; and
  control means for controlling operations of at least the management information generating means and the recording means,
    wherein the control means switches a recording format of the file and the management information with respect to the user area in accordance with an attribute of the file, to record, onto a recording medium, management information in a previous recording format when start of recording in a new recording format is instructed, to close the recorded file in the previous recording format to start recording in the new recording format, and to perform an erasing operation of a unit file before management information corresponding to the unit file is recorded onto the recording medium by the recording means for a management information recording area,
    wherein the erasing operation discriminates whether a last VTS (Video Title Set) recorded on the recording medium is closed to erase a last unit file recorded on the recording medium by instruction of a user when the VTS is not closed.

8. The recording apparatus as set forth in claim 7,
  wherein the recording medium is DVD-R (DVD-Recordable), and
  when the file is file of moving picture, the file is VTS (Video Title Set) in DVD video format and the management information is VMGI (Video Manager Information) in the DVD video format, and
  wherein the control means sets the recording format of the file and the management information for recording in the DVD video format, performs management of DVD video file by temporary VMGI, and performs management of an extended file except for DVD video file by intermediate management information (TMP_EXTI).

9. The recording apparatus as set forth in claim 8, wherein the control means records and stores, the management information recorded on the recording medium to form a set with the file, and generates the management information to be recorded into the management information recording area from the stored management information.

10. The recording apparatus as set forth in claim 7, wherein the control means controls operations of the management information generating means and the recording means to collectively record the management information by the set with respect to all files recorded on the recording medium into a first management information recording area of a management information recording area of the recording medium, and to collectively record the management information by the set with respect to the file of a specific attribute recorded on the recording medium into a second management information recording area of the management information recording area.

11. The recording apparatus as set forth in claim 7, wherein the first management information recording area is an area corresponding to a file management system of a processor, and the second management information recording area is an area corresponding to a file management system of DVD video format.

12. A non-transitory recording medium storing a control program that when executed on a processor causes recording, into a user area of a data recording medium, a file to be recorded and management information for the file in such a manner that the file and the management information form a set, the program comprising the steps of:

switching, in accordance with attribute of the file, recording format of the file and the management information with respect to the user area;

recording, onto the data recording medium, management information in a previous recording format when start of recording in a new recording format is instructed, and closing the recorded file in the previous recording format to start recording in the new recording format; and erasing a unit file before the management information corresponding to the unit file is recorded onto the recording medium by the recording step for a management information recording area, wherein the erasing step comprises discriminating whether a last VTS (Video Title Set) recorded on the recording medium is closed to erase the last unit file recorded on the recording medium by instruction of a user when the VTS is not closed.

13. A non-transitory recording medium storing a control program that when executed on a processor causes recording, into a user area of a data recording medium, a file to be recorded and management information for the file in such a manner that the file and the management information form a set, the program comprising the steps of:

recording, onto the data recording medium, management information of recording format when start of new recording, after user has performed a predetermined number of recording operations, is instructed, and closing the recorded file to start new recording; and erasing a unit file before the management information corresponding to the unit file is recorded onto the recording medium by the recording step for a management information recording area, wherein the erasing step comprises discriminating whether a last VTS (Video Title Set) recorded on the recording medium is closed to erase the last unit file recorded on the recording medium by instruction of a user when the VTS is not closed.

* * * * *